United States Patent
Kiuchi et al.

(10) Patent No.: US 6,737,828 B2
(45) Date of Patent: May 18, 2004

(54) WASHING MACHINE MOTOR DRIVE DEVICE

(75) Inventors: Mitsuyuki Kiuchi, Nara (JP);
Norimasa Kondo, Osaka (JP);
Sadayuki Tamae, Osaka (JP); Hisashi Hagiwara, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 36 days.

(21) Appl. No.: 10/187,199

(22) Filed: Jul. 2, 2002

(65) Prior Publication Data

US 2003/0020431 A1 Jan. 30, 2003

(30) Foreign Application Priority Data

Jul. 19, 2001 (JP) .................................. 2001-219388
Aug. 7, 2001 (JP) .................................. 2001-238767

(51) Int. Cl.$^7$ ........................... H02P 5/04; H02K 23/00; D06F 33/00
(52) U.S. Cl. .............. 318/779; 318/55; 318/59; 318/62; 318/71; 318/269; 318/272; 318/431; 318/432; 318/254; 68/12.02; 68/12.16
(58) Field of Search ................ 318/254, 138, 318/439, 779, 778, 802, 803, 805, 806, 612, 689, 55, 56, 59, 60, 62, 63, 71, 87, 101, 269, 272, 376, 431, 432, 455; 68/12.02, 12.04, 12.16, 12.23, 12.27, 23.7

(56) References Cited

U.S. PATENT DOCUMENTS

| | | | | |
|---|---|---|---|---|
| 4,556,827 A | * | 12/1985 | Erdman | 318/254 |
| 4,885,518 A | * | 12/1989 | Schauder | 318/798 |
| 5,237,256 A | * | 8/1993 | Bashark | 318/817 |
| 5,463,301 A | * | 10/1995 | Kim | 318/801 |
| 5,510,689 A | * | 4/1996 | Lipo et al. | 318/809 |
| 5,813,069 A | * | 9/1998 | Kim | 8/159 |
| 5,998,958 A | * | 12/1999 | Lee | 318/801 |
| 6,194,864 B1 | * | 2/2001 | Kinpara et al. | 318/805 |
| 6,229,719 B1 | * | 5/2001 | Sakai et al. | 363/37 |
| 6,262,555 B1 | * | 7/2001 | Hammond et al. | 318/759 |
| 6,495,980 B2 | * | 12/2002 | Cho et al. | 318/254 |
| 6,605,912 B1 | * | 8/2003 | Bharadwaj et al. | 318/439 |

FOREIGN PATENT DOCUMENTS

| | | | | |
|---|---|---|---|---|
| JP | 11-090088 | | 4/1999 | ........... H02P/7/63 |
| JP | 2001-046777 | | 2/2001 | ........... H02P/3/18 |
| JP | 2002315387 A | * | 10/2002 | ........... H02P/6/24 |
| JP | 2003088168 A | * | 3/2003 | ........... H02P/6/24 |
| JP | 2003135883 A | * | 5/2003 | ........... D06F/33/02 |

OTHER PUBLICATIONS

Translation Document 11-090088.*
Translation Document 2001-046777.*

* cited by examiner

Primary Examiner—Rina Duda
Assistant Examiner—Edgardo San Martin
(74) Attorney, Agent, or Firm—Wenderoth, Lind & Ponack, L.L.P.

(57) ABSTRACT

A washing machine motor drive device drives a motor using an inverter circuit, which implements a constant torque control through a change in the torque-revolution speed characteristic of the motor. This facilitates an easy control of braking torque (negative torque), thereby providing a maximized braking torque. An easy control of regenerative energy is also provided, and back electromotive force is consumed by the internal resistance of the motor. Practically described, DC power of a rectifier circuit connected to an alternating current source is converted by an inverter circuit into AC power for driving the motor for operating an agitator or a washing/spinning tub. Motor rotor position is detected by rotor position detector, motor current is detected by current detector, and a control device controls the inverter circuit for resolving the motor current into a current component corresponding to magnetic flux and a current component corresponding to torque. At a motor braking operation, the current component corresponding to magnetic flux and the current component corresponding to torque are controlled independently. As a result, the torque at high speed revolution can be increased, or the efficiency at low speed revolution can be improved. This leads to the use a downsized and energy-conscious motor, and contributes to the prevention of an abnormal rise of DC voltage in the inverter circuit.

17 Claims, 28 Drawing Sheets

WASHING MACHINE MOTOR DRIVE DEVICE

FIELD OF THE INVENTION

The present invention relates to a device for driving washing machine motor using an inverter circuit.

BACKGROUND OF THE INVENTION

It has been proposed to improve performance of a washing machine motor through vector control using an inverter circuit (an example of such a proposal is included in JP 11090088).

FIG. 28 is a block diagram showing the structure of a washing machine of the above-described category. In FIG. 28, a three-phase induction motor 100 drives an agitator 102, or a spin tub 104. Current detectors 126a, 126b, 126c detect the motor current and control the torque current component and the magnetizing current component independently as vectors for driving the motor via an inverter circuit 124. In this way, the motor 100 is increased in torque at low speed revolution, and driven with approximately the same torque characteristic as a DC brushless motor.

It is also proposed to apply electric braking to a washing machine motor using an inverter, for the purpose of improving the braking reliability and lowering the braking noise caused by a mechanical band brake (an example: the Japanese Laid-open Patent No. 2001-46777). Namely, it aims to improve the reliability by controlling at the revolution retardation of the sinusoidal wave voltage phase by means of PWM control so that the power generation energy is consumed by the internal resistance of a motor, in other words dynamic braking, without causing regenerative energy in a DC source of an inverter circuit.

In the above-described conventional configuration, however, vector technology using an inverter circuit for improving the performance of a motor works to improve torque of a three-phase induction motor at low speed revolution, but it is difficult to improve the efficiency of a motor. Moreover, the low efficiency of the three phase induction motor allows a large current to flow, resulting in increased motor noise. These are problems that need to be solved.

With respect to the electric braking of a motor by means of an inverter control, it needs a complicated control to have the entire power generation energy consumed by the internal resistance of a motor. Furthermore, it does not provide sufficient braking torque for the increasing brake current of a motor.

SUMMARY OF THE INVENTION

The present invention addresses the above drawbacks, and aims to offer a compact and energy-conscious motor with which a constant torque control can be performed by changing the motor torque—revolution speed characteristic, and the torque at high speed revolution can be increased, or the efficiency at low speed revolution can be improved.

A washing machine motor drive device in accordance with the present invention comprises an alternating current source, a rectifier circuit connected to the alternating current source, an inverter circuit for converting DC power of the rectifier circuit into AC power, a motor driven by the inverter circuit for driving an agitator or a washing/spinning tub, a rotor position detector for detecting the rotor position of the motor, a current detector for detecting motor current, and a control device for controlling the inverter circuit. The control device resolves motor current into a current component that corresponds to magnetic flux and a current component that corresponds to torque, and controls the current component corresponding to magnetic flux and the current component corresponding to torque independently in accordance with motor control stages. In the above-described structure, motor current of a DC brushless motor is detected to be resolved into a current component corresponding to magnetic flux and a current component corresponding to torque for practicing vector control. At low speed revolution, mainly the current component corresponding to torque is controlled for yielding maximized efficiency, while at high speed revolution, the current component corresponding to magnetic flux is increased in a negative direction for increasing the current through a flux-weakening control for implementing a maximum torque control. Thereby, the motor torque—revolution speed characteristic can be changed and a constant torque control can be implemented. This enables an increase in torque at high speed revolution, or an improvement in efficiency at low speed revolution. Therefore, a motor can be made smaller in size and more energy-conscious.

A washing machine motor drive device in accordance with the present invention comprises a control device, with which device the current component corresponding to magnetic flux and the current component corresponding to torque are controlled independently in accordance with a revolution speed of a motor. In the above configuration, the motor torque—revolution speed characteristic can be modified.

A washing machine motor drive device in the present invention comprises a control device, with which device the current component corresponding to magnetic flux is increased in the negative direction when a motor is revolving at a high speed. This makes it possible to increase the torque at high speed revolution and perform a precise flux-weakening control.

A washing machine motor drive device in the present invention comprises a control device, with which device the current component corresponding to magnetic flux is controlled to be substantially zero when a motor is revolving at a low speed. This makes it possible to revolve a motor at a highest efficiency in low speed revolution.

A washing machine motor drive device in the present invention comprises a control device, with which device the current component corresponding to magnetic flux is increased in the negative direction when a motor is revolving at a high speed for driving a washing/spinning tub for the purpose of dehydration (drying). This makes it possible to increase the torque at a high speed revolution by means of a flux-weakening control, and control the dehydration operation covering up to a high revolution speed. As a result, a rate of the dehydration can be increased by increasing the revolution speed.

A washing machine motor drive device in the present invention comprises a control device, with which device the current component corresponding to magnetic flux is increased in the negative direction when a motor is revolving at a high speed for driving an agitator for the purpose of washing. This makes it possible to increase the torque at a high speed revolution by means of a flux-weakening control, and control the agitating operation covering up to a high revolution speed. As a result, the washing capability can be increased by strengthening the water flow.

A washing machine motor drive device in the present invention comprises a clothes amount detector for detecting an amount of clothes in a washing/spinning tub, and a control device for controlling the current component corresponding to magnetic flux and the current component corresponding to torque independently in accordance with the amount of the clothes in the washing/spinning tub detected by the clothes amount detector. This makes it possible to increase the torque at a high speed revolution by means of a flux-weakening control in accordance with the amount of clothes, and control the operation covering up to a high revolution speed even in a case where there are many clothes in a washing tub. Thus, the washing capability can be improved, and rate of the dehydration can be raised as well.

A washing machine motor drive device in the present invention comprises a start control device in which the control device controls motor revolution at the startup stage. The start control device performs a direct control on a voltage to be applied to a motor at the startup stage, and then controls the current component corresponding to magnetic flux and the current component corresponding to torque independently. This makes it easy to introduce a soft-start, where a startup current is suppressed and a starting torque is lowered, and then proceeds smoothly to a current feedback control to the effect of preventing an abnormal increase of revolving speed.

A washing machine motor drive device in the present invention comprises a start control device for controlling motor revolution at the startup stage for the control device. The start control device performs a direct control on a voltage to be applied to a motor at the startup stage, and then controls the current component corresponding to magnetic flux and the current component corresponding to torque independently in accordance with the revolution speed. Besides making the shift to current feedback control smooth and suppressing the abnormal increase of revolution speed, this makes it possible to use an AC transformer, which is inexpensive, in the current detector. As a result, it is advantageous to implement a motor drive device that is inexpensive yet has high performance.

A washing machine motor drive device in the present invention comprises an alternating current source, a rectifier circuit connected to the alternating current source, an inverter circuit for converting DC power of the rectifier circuit into AC power, a motor which is driven by the inverter circuit for driving an agitator or a washing/spinning tub, a rotor position detector for detecting the rotor position of a motor, a current detector for detecting motor current, and a control device for controlling an inverter circuit. The control device resolves a motor current into a current component that corresponds to magnetic flux and a current component that corresponds to torque, and controls the current component corresponding to magnetic flux and the current component corresponding to torque independently for retarding revolution of a motor. In the above-described structure where a motor current is resolved into the current component corresponding to magnetic flux and the current component corresponding to torque for performing a braking operation through vector control, a highest braking torque is yielded by vector controlling the current component corresponding to torque, while prevention of an abnormal rise of DC voltage in inverter circuit is performed by means of a control on regenerative energy, which is realized through a control on the current component corresponding to magnetic flux.

A washing machine motor drive device in the present invention comprises a control device, with which device the current component corresponding to torque is controlled to be exhibiting a certain specific value at braking operation. This makes it possible to control a braking torque to be at a certain specific value, and optimize the braking time.

A washing machine motor drive device in the present invention comprises a control device, with which device the current component corresponding to torque is controlled at braking to show a certain specific negative value. By specifying a negative torque current component, the braking torque can be controlled to show a certain specific value, and the braking time can be shortened.

A washing machine motor drive device in the present invention comprises a control device, with which device the current component corresponding to magnetic flux and the current component corresponding to torque are controlled at braking to exhibit, respectively, certain specific values. Under this structure, a back electromotive force of a motor and an energy consumption by the internal resistance of the motor can be controlled independently. As a result, the regenerative energy can be controlled, and an abnormal rise of DC voltage in the inverter circuit can be prevented.

A washing machine motor drive device in the present invention comprises a control device, with which device the current component corresponding to magnetic flux is specified to be greater than that corresponding to torque, at the start of motor braking. This makes it possible to avoid an excessive braking torque exerted at the start of braking, as well as an abnormal rise of DC voltage in the inverter circuit caused by regenerative energy.

A washing machine motor drive device in the present invention comprises a revolution speed detector for detecting revolution speed based on output signal generated from the rotor position detector, and a control device for controlling in accordance with revolution speed, the current component corresponding to magnetic flux and the current component corresponding to torque to exhibit respectively certain specific values at braking. Since a braking torque and an energy consumption by the internal resistance of the motor can be controlled independently in accordance with revolution speed, an increase of regenerative energy in the high speed revolution region, as well as a decrease of braking torque in the low speed revolution region, can be prevented.

A washing machine motor drive device in the present invention comprises an alternating current source, a rectifier circuit connected to the alternating current source, an inverter circuit for converting DC power of the rectifier circuit into AC power, a motor driven by the inverter circuit for driving an agitator or a washing/spinning tub, a rotor position detector for detecting the rotor position of a motor, a current detector for detecting motor current, a DC voltage detector for detecting DC voltage of the inverter circuit, and a control device for controlling the inverter circuit. The control device resolves a motor current into a current component that corresponds to magnetic flux and a current component that corresponds to torque, and controls the current component corresponding to magnetic flux and the current component corresponding to torque independently so that the DC voltage is brought to a certain specific value at braking of a motor. In the above-described structure, where the DC voltage of inverter circuit can be controlled to meet a certain specific value through controlling the regenerative energy, energy for driving the inverter circuit is supplied from the back electromotive force of the motor. As a result, a braking failure at power failure can be prevented.

A washing machine motor drive device in the present invention comprises a control device, with which device the current component corresponding to magnetic flux or the voltage component is controlled at braking so that the DC voltage of an inverter circuit is brought to a certain specific value. Under the above-described structure, since the regenerative energy can be controlled to secure a certain specific braking torque, braking time is kept short even with a power failure.

A washing machine motor drive device in the present invention comprises an alternating current source, a rectifier circuit connected to the alternating current source, an inverter circuit for converting DC power of the rectifier circuit into AC power, a motor driven by the inverter circuit for driving an agitator or a washing/spinning tub, a rotor position detector for detecting the rotor position of a motor, a current detector for detecting motor current, a motor electric power detector for detecting motor electric power, and a control device for controlling the inverter circuit. The control device resolves a motor current into a current component that corresponds to magnetic flux and a current component that corresponds to torque, and controls at braking the current component corresponding to magnetic flux and the current component corresponding to torque independently in accordance with motor electric power. In the above-described structure, the balance between the back electromotive force of a motor and the energy consumption by a motor coil can be judged based on the motor electric power. Therefore, by controlling the current component corresponding to magnetic flux or the voltage component corresponding to magnetic flux in accordance with the small/large of motor electric power, a back electromotive force can be controlled so that it does not cause regeneration in the inverter circuit. Thus, an abnormal rise of DC voltage in the inverter circuit is avoided.

A washing machine motor drive device in the present invention comprises a motor electric power detector for detecting motor electric power, with which a calculation is performed based on the electric power component corresponding to magnetic flux and the electric power component corresponding to torque. Under this structure, since the motor electric power is detected instantaneously, an abnormality in the balance between the back electromotive force of the motor and the energy consumption by the motor coil can be judged instantaneously. Thus, an influence of regenerative power to the DC source in the inverter circuit can be avoided in advance.

DETAILED DESCRIPTION OF THE INVENTION

Figure 1:
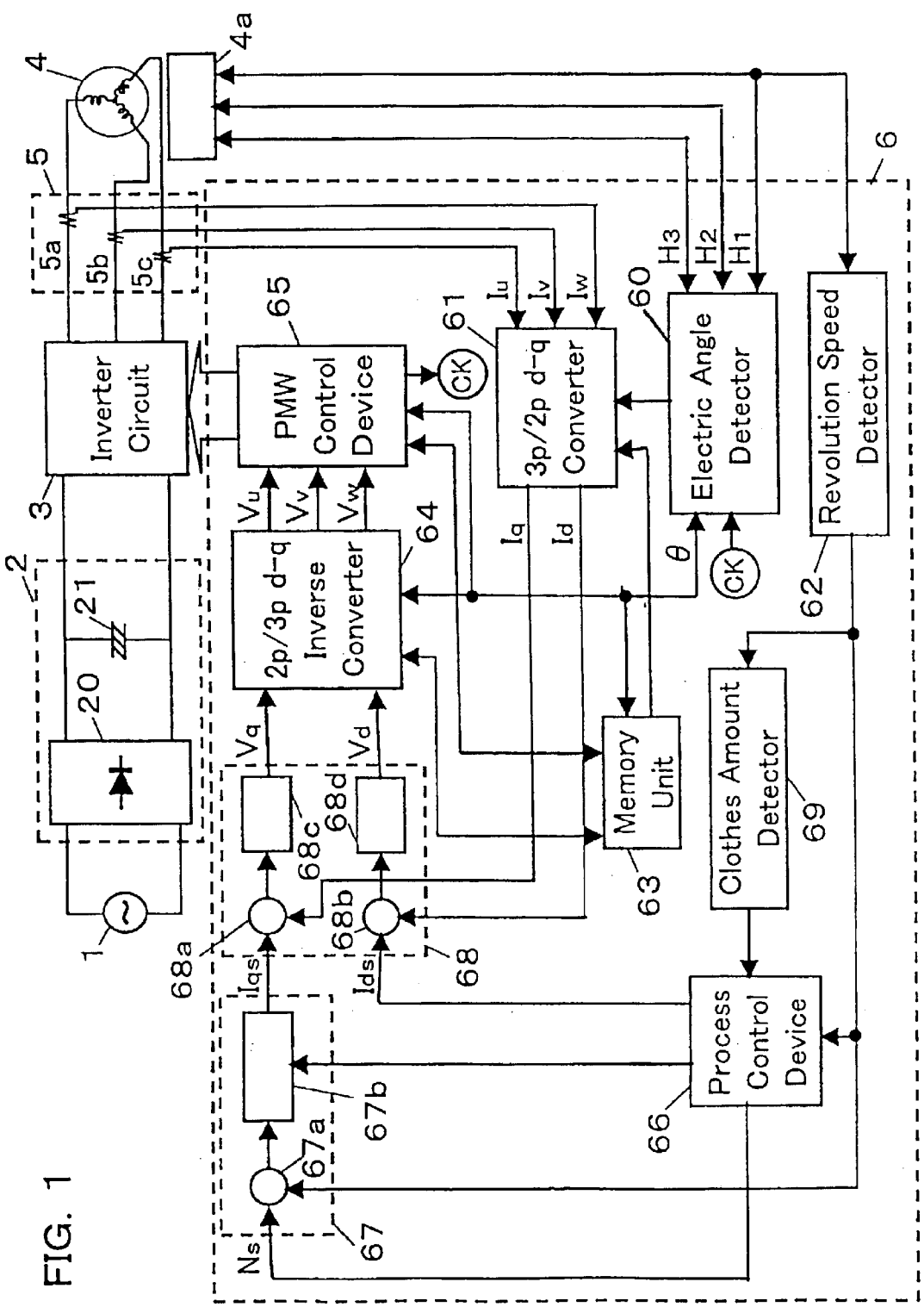
FIG. 1 is a block diagram showing the structure of a washing machine motor drive device in accordance with a first exemplary embodiment of the present invention.

Now in the following, exemplary embodiments of a washing machine motor drive device in accordance with the present invention are described in detail referring to the drawings.

Embodiment 1

FIG. 1 is a block diagram showing the structure of a washing machine motor drive device in accordance with a first exemplary embodiment of the present invention. In FIG. 1, an AC source 1 delivers alternating current to a rectifier circuit 2 to be converted there into DC power with a rectifier 20 and a capacitor 21. The DC voltage is supplied to an inverter circuit 3.

The inverter circuit 3 is a three-phase full-bridge inverter circuit which is formed of six power switching semiconductor devices and antiparallel diodes. Normally, the inverter circuit 3 has an intelligent power module (IPM) having an insulated gate bipolar transistor (IGBT) and antiparallel diodes with a built-in driver circuit and protection circuit. Output terminal of inverter circuit 3 is connected to a motor 4, the motor 4 for driving an agitator (not shown) or a washing/spinning tub (not shown).

A DC brushless motor is used for motor 4. The relative positioning (rotor position) between a rotor, which is a permanent magnet, and a stator is detected by a rotor position detector 4a. The rotor position detector 4a is normally formed of three hall ICs, and detects the position signal at each electric angle of 60°. A current detector 5 is provided for detecting the phase currents Iu, Iv, Iw of motor 4, and a DC transformer that can measure low frequencies including DC current is normally used. However, an AC transformer can also detect the phase currents, and a description will be made on this point later. In the case of a three-phase motor, it is a normal practice to first obtain the current for two phases and then the remaining one phase is calculated from the Kirchhoff laws (Iu+Iv+Iw=0).

Control device 6 is provided for controlling the inverter circuit 3. The control device 6 roughly, is formed of a microcomputer, an inverter control timer (PWM timer) built in the microcomputer, a high speed A/D converter, and a memory circuit (ROM, RAM), etc. Describing the control device 6 more in detail, it is formed of an electric angle detector 60 for detecting electric angle based on the output signal from rotor position detector 4a, a three-phase/two-phase d-q converter 61 for resolving into a current component Id corresponding to magnetic flux and a current component Iq corresponding torque based on the output signal from current detector 5 and the signal from electric angle detector 60, a revolution speed detector 62 for detecting rotor revolution speed, a memory unit 63 for storing sinusoidal wave data (sin, cos data) needed when converting a stationary coordinate frame into a rotational coordinate frame or vice-versa, a two-phase/three-phase d-q inverse converter 64 for converting a voltage component Vd corresponding to magnetic flux and a voltage component Vq corresponding to torque into the three-phase motor drive control voltages vu, vv, vw, and a PWM control device 65 which controls the switching of IGBT in inverter circuit 3 in accordance with the three-phase motor drive control voltages vu, vv, vw.

The control device 6 also contains a process control device 66 for controlling the start, the stop of revolution and the braking, etc. of motor 4 in accordance with a washing stage or dehydration stage, a revolution speed control device 67 for controlling the number of revolutions of motor 4 in accordance with an output signal from revolution speed detection device 62, a motor current control device 68 for calculating a voltage component Vd corresponding to magnetic flux and a voltage component Vq corresponding to torque which are needed for controlling the motor current, after comparing d-axis (direct axis) current specifying signal Ids from process control device 66 and revolution speed control device 67, q-axis (quadrature axis: horizontal axis in perpendicular amplitude modulation) current specifying signal Iqs and Id, Iq calculated from the three-phase/two-phase d-q converter 61, and a clothes amount detector 69.

A constant torque control can be implemented by introducing a feedback control so that the q-axis current Iq corresponding to torque is made to meet a specified value Iqs. However, when the revolution speed goes high the motor induction voltage rises and the torque current Iq stops increasing. So, if the d-axis current is increased in accordance with the revolution speed, the q-axis current can also be increased leading to an increased torque.

Figure 2:
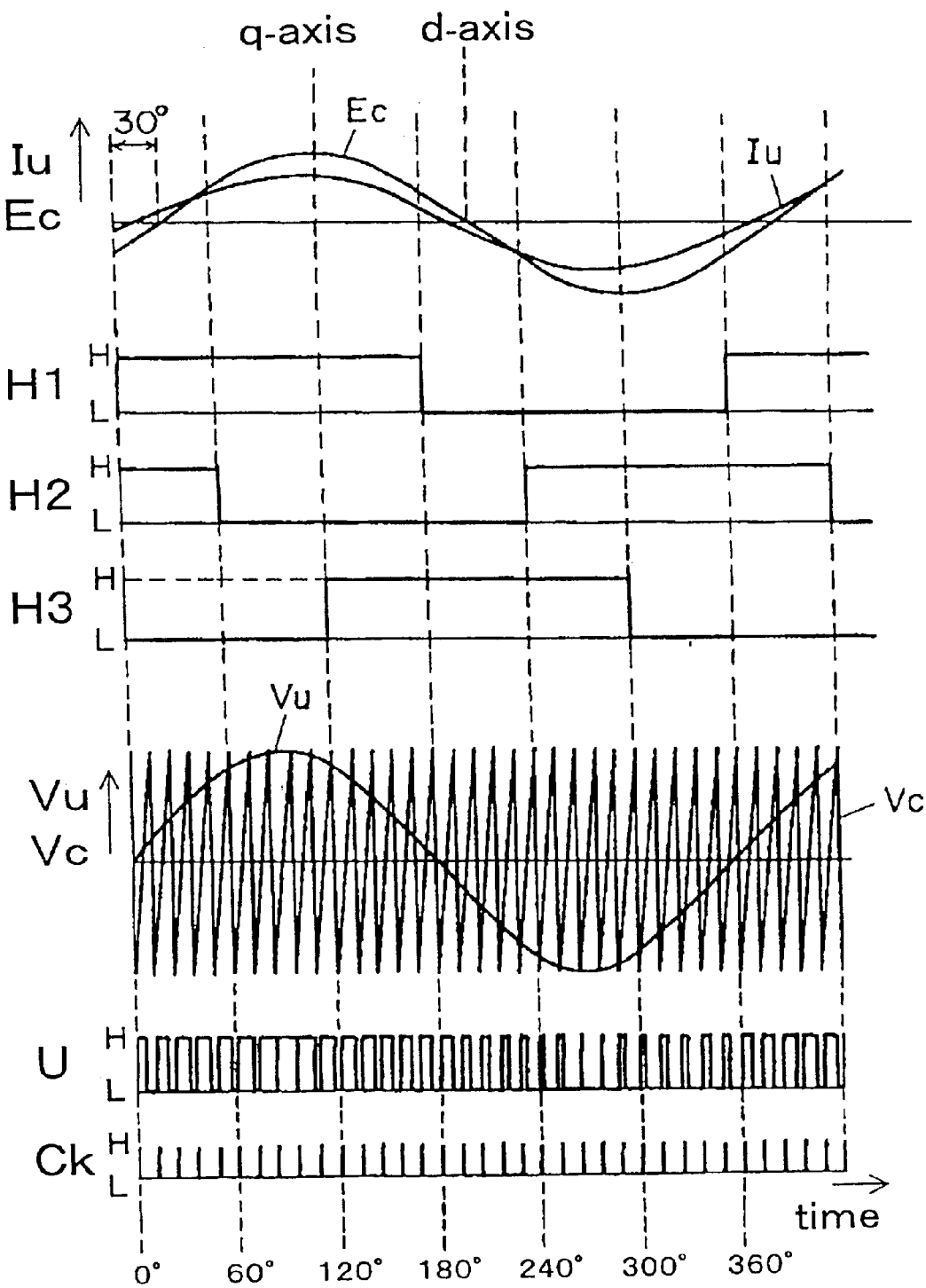
FIG. 2 is a timing chart used to describe the operation of the washing machine motor drive device in the first embodiment.

FIG. 2 shows waveforms at respective parts. The edge signal of output signals H1, H2, H3 from rotor position detector 4a changes at each 60° thereby exhibiting an angle of 360° divided by six. Taking the high edge of signal H1, where it goes from low to high, as reference electric angle 0°, the induction voltage Ec at U-phase winding of motor 4 assumes a waveform lagging behind the reference signal H1 by 30°. The efficiency is maximized when the U-phase motor current Iu and the motor induction voltage Ec have a same phase. The motor induction voltage Ec takes an axis that is identical to the q-axis, while the d-axis is behind by 90°. Since the q-axis current shares the same phase as the motor induction voltage, it is called a torque current.

Referring to FIG. 2, the U-phase motor current Iu is slightly ahead of the U-phase winding induction voltage Ec, while the motor voltage Vu has a waveform that is ahead of the U-phase winding induction voltage Ec by 30°. The Vc represents a sawtooth carrier signal generated in the PWM control device 65, while the Vu is U-phase control voltage having a sinusoidal waveform. A PWM signal U is generated in the PWM control device 65 by comparing the carrier signal Vc and the U-phase control voltage Vu. The PWM signal is added as a control signal to the U-phase upper arm transistor in inverter circuit 3. The Ck represents a synchronous signal of the carrier signal Vc which is the interrupt signal that works when a carrier counter counts-up and overflows.

An electric angle at which the axis of rotor magnet and the axis of stator magnetic flux of motor 4 coincide is established as the d-axis, and conversion from the stationary coordinate system to the revolving coordinate system, by means of a d-q conversion, is conducted with the reference electric angle 0°. So, the electric angle detector 60 detects electric angles 30°, 90°, 150°, etc. from the output signals H1, H2, H3 of rotor position detector 4a, and an electric angle θ other than that at every 60° is provided by inference.

The current component that corresponds to magnetic flux is generally called the d-axis current Id. Since the magnetic flux of the permanent magnet and the magnetic flux of the field magnet share the same axis and the permanent magnet is being pulled by the field magnet, the torque at this state is zero.

An axis that takes the same phase as the induction voltage phase at 90° from the d-axis in electric angle is called as q-axis, at which the torque is maximized. Since it is a current component corresponding to torque, it is referred to as q-axis current Iq. Furthermore, if the d-axis current is increased in the negative direction, it creates an effect that is equivalent to weakening the field magnet magnetic flux on d-axis. This is referred to as flux-weakening control. Since it performs a resolution into d-axis current and q-axis current, and controls them independently, it is referred to as vector control.

The three-phase/two-phase d-q converter 61 converts motor currents Iu, Iv, Iw into the d-axis current Id and the q-axis current Iq in accordance with (formula 1). The Id, Iq are calculated based on the instantaneous value of motor current detected corresponding to the electric angle θ.

$$\begin{bmatrix} Id \\ Iq \end{bmatrix} = \begin{bmatrix} \cos\theta & \sin\theta \\ -\sin\theta & \cos\theta \end{bmatrix} \times \sqrt{\frac{2}{3}} \begin{bmatrix} 1 & -\frac{1}{2} & -\frac{1}{2} \\ 0 & \frac{\sqrt{3}}{2} & \frac{\sqrt{3}}{2} \end{bmatrix} \begin{bmatrix} Iu \\ Iv \\ Iw \end{bmatrix}$$

$$= \sqrt{\frac{2}{3}} \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \begin{bmatrix} Iu \\ Iv \\ Iw \end{bmatrix}$$

[formula 1]

Figure 3:
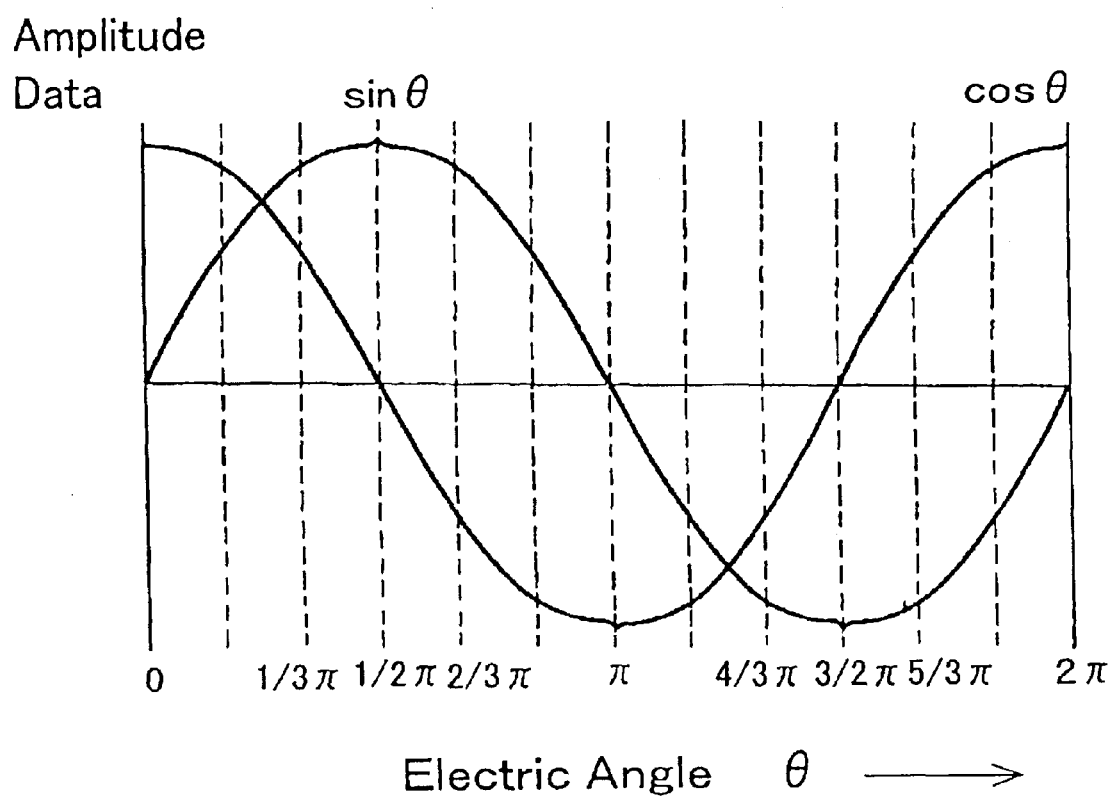
FIG. 3 is a chart showing the relationship of amplitude-electric angle θ in the operation of the washing machine motor drive device in the first embodiment.

Data about the amplitude and the electric angle θ of sin θ, cos θ shown in FIG. 3 are stored in memory unit 63. So, the resolution into d-axis current Id and q-axis current Iq can be made by calling out the data corresponding to the electric angle and doing the sum and integration thereon. Detection of the electric angle θ and the instantaneous value of motor current is conducted in synchronization with the carrier signal. Details of this procedure will be described later referring to a relevant flow chart.

Revolution speed detector 62 detects motor revolution counts from the output reference signal H1 of rotor position detector 4*a*, and delivers the signal on revolution counts to the process control device 66, the revolution speed control device 67 and the clothes amount detector 69. The process control device 66 controls the start of motor 4 and specifies number of revolutions as well as the d-axis current corresponding to the revolution counts. The revolution counts specifying signal Ns is delivered to the revolution speed control device 67, while the d-axis setting signal Ids is delivered to the motor current control device 68.

The revolution speed control device 67 is formed of a revolution counts comparison device 67*a* for comparing a detected number of revolutions N with revolution count specifying signal Ns, and a torque current specifying device 67*b* for controlling q-axis current specified value Iqs in accordance with an error signal ΔN between revolution counts N and specified revolution counts Ns and a shift ratio (acceleration) of revolution speed. It controls the q-axis current Iq corresponding to torque of motor 4 to meet with the specified value Iqs.

The motor current control device 68 outputs control voltage signals Vq, Vd after comparing the output signals Iq, Id of three-phase/two-phase d-q converter 61 with the specified signals Iqs, Ids, respectively. The motor current control device 68 is formed of a q-axis current comparison device 68*a*, a q-axis voltage specifying device 68*c* a d-axis current comparison device 68*b* and a d-axis voltage specifying device 68*d*, and generates voltage signals Vq, Vd, which control the q-axis current and the d-axis current, respectively.

The two-phase/three-phase d-q inverse converter 64 calculates three-phase motor drive control voltages vu, vv, vw from voltage signals Vq, Vd in accordance with (formula 2). The inverse converter 64 delivers in synchronization with the carrier signal, the sinusoidal waveform signal that corresponds to the electric angle θ detected by the electric angle detector 60 to the PWM control device. The method of processing the sin θ and cos θ data stored in memory unit 63 remains almost the same as that used in the three-phase/two-phase d-q converter 61.

$$\begin{bmatrix} Vu \\ Vv \\ Vw \end{bmatrix} = \sqrt{\frac{2}{3}} \begin{bmatrix} 1 & 0 \\ \frac{1}{2} & \frac{\sqrt{3}}{2} \\ \frac{1}{2} & \frac{\sqrt{3}}{2} \end{bmatrix} \begin{bmatrix} \cos\theta & -\sin\theta \\ \sin\theta & \cos\theta \end{bmatrix} \begin{bmatrix} Vd \\ Vq \end{bmatrix}$$

$$= \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta - \frac{4\pi}{3}\right) & -\sin\left(\theta - \frac{4\pi}{3}\right) \end{bmatrix} \begin{bmatrix} Vd \\ Vq \end{bmatrix}$$

[formula 2]

Figure 4:
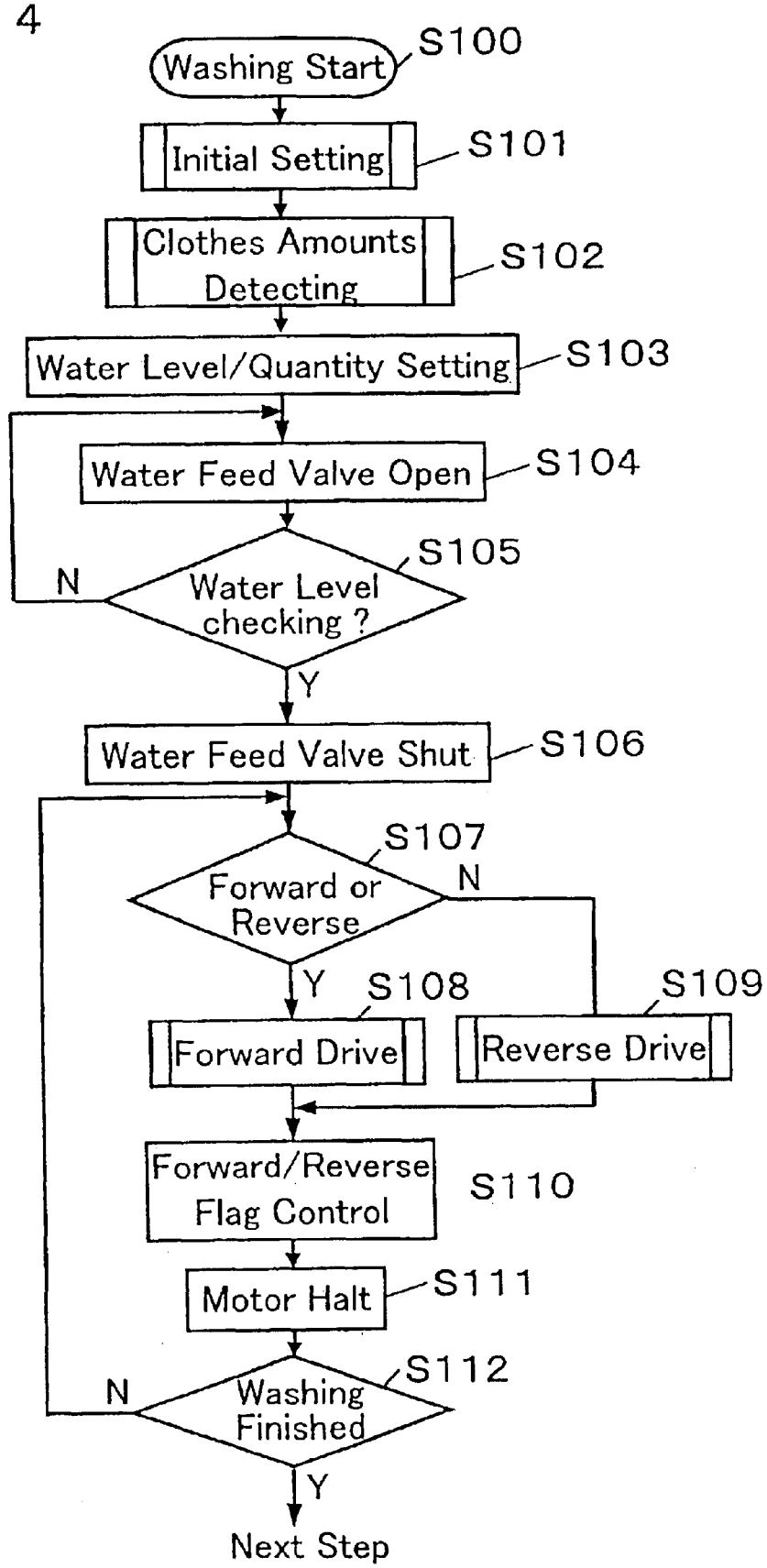
FIG. 4 is a flow chart used to describe the washing operation of the washing machine motor drive device in the first embodiment.

Next, the operation of the control device 6 built in the washing machine motor drive device in the first embodiment of the present invention is described. FIG. 4 is a flow chart showing the washing operation in accordance with the present invention. The washing starts at step S100, various initial settings for washing are made at step S101, and then at S102 the amount of clothes within a washing/spinning tub is detected. The clothes amount is generally detected by moving the agitator with motor 4 and observing the startup speed of motor revolution, or observing the internal revolution after discontinuation of driving.

At S103, water level, water flow, etc. for the clothes amount are specified, and then a water feed valve (not shown) is opened at S104, whether or not the level of water in washing/spinning tub reached the specified level is judged at S105. As soon as it reaches the specified level, the water feed valve is shut at S106, if the specified level has not yet been reached, the level the water feed valve is kept open.

An agitation process starts at S107, and based on a flag, forward revolution or reverse revolution is judged. If the judgement is forward revolution, the operation proceeds to S108 to drive the motor 4 in forward direction, or if reverse revolution is indicated, the operation proceeds to S109 to drive the motor in reverse direction. A detailed flow chart for driving the motor will be described later at a motor drive subroutine referring to FIG. 6.

After the motor drive subroutine is executed and the agitator is put in operation for a certain specific time, the forward/reverse flag is controlled at S110, and then the operation proceeds to S111 and the motor 4 is stopped for a certain specific time span. Then the operation proceeds to S112, where it is judged whether the washing procedure is finished or not. If the washing procedure is judged to be finished, the operation proceeds to the subsequent step, if the washing procedure is judged not to be finished, the operation returns to S107.

Figure 5:
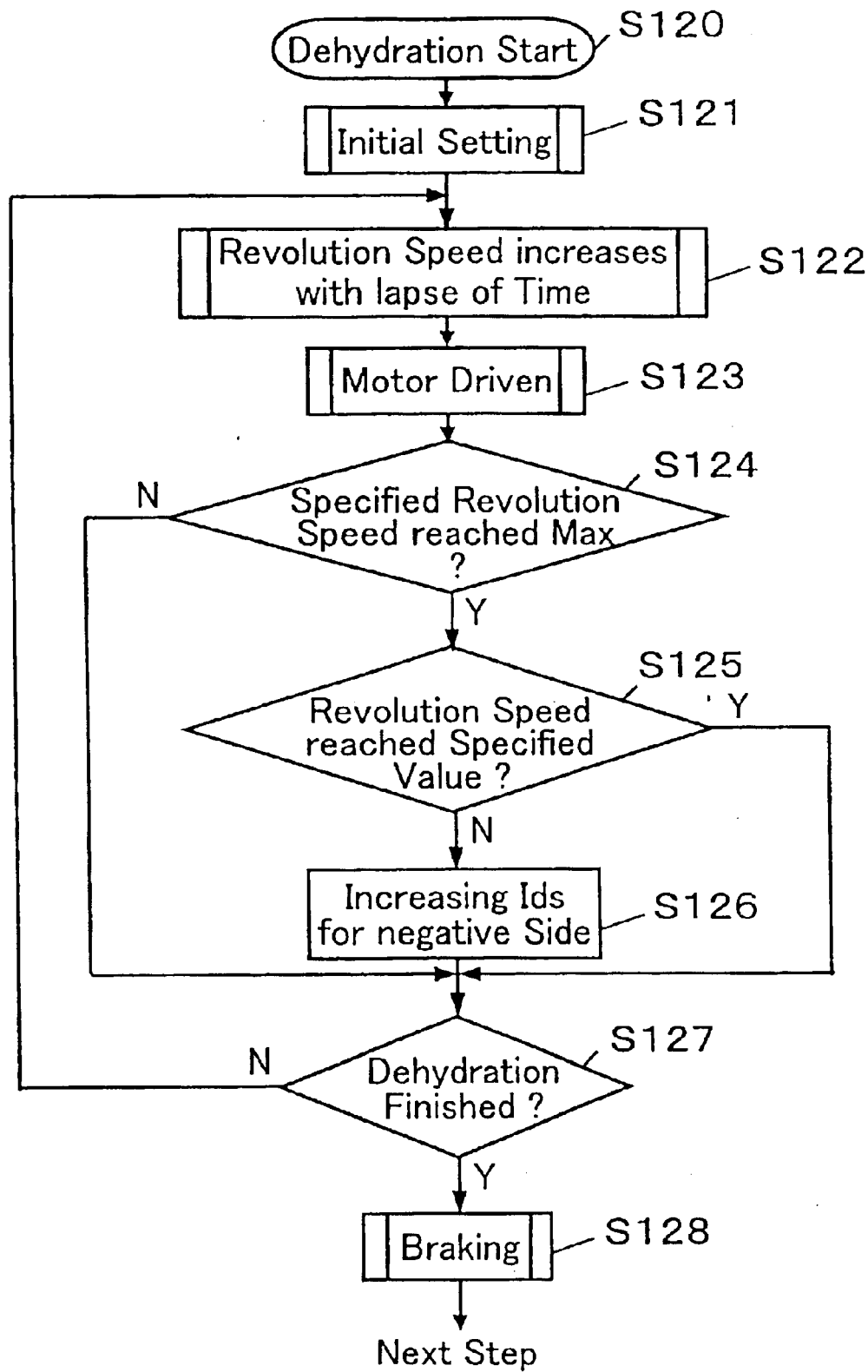
FIG. 5 is a flow chart used to describe a dehydration operation of the washing machine motor drive device in the first embodiment.

FIG. 5 is a flow chart of the dehydration operation. The dehydration operation starts at step S120, the highest revolving speed Ns max. during the dehydration operation, the speed of increasing the revolution, and the like initial settings are made at S121, and then at S122, the revolution speed is specified so that the specified revolution speed goes higher along with the lapse of time.

Figure 6:
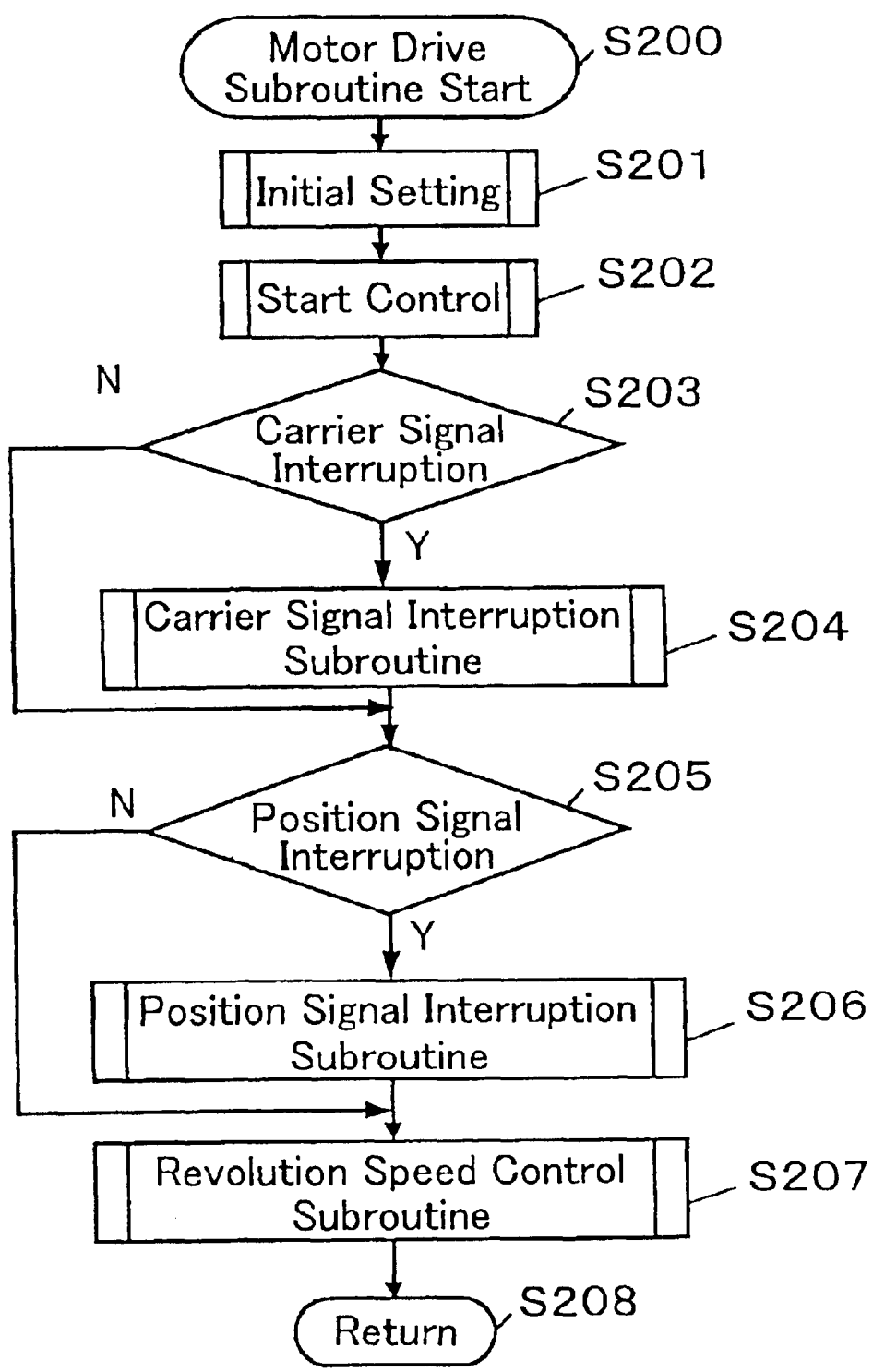
FIG. 6 is a flow chart used to describe the operation of a motor drive subroutine in the washing machine motor drive device in the first embodiment.

Then at S123, a motor drive subroutine shown in FIG. 6 is executed, and at S124 whether or not the specified revolution speed Ns reached the highest value Ns max. is judged. When the highest value Ns max. is reached, the operation proceeds to S125, where whether or not the motor revolution speed N is substantially identical to the highest specified value Ns max. is judged. If the revolution speed N has not yet reached within a range of a certain specified number of revolutions, the operation proceeds to S126 to have the d-axis current specified value Ids increased in the negative direction and then proceeds to S127. If the revolution speed N is substantially identical with the highest specified value Ns max., the operation jumps to S127 without executing S1126 executed.

At S127, whether or not the dehydration operation is finished is judged. If judged finished, the operation proceeds to S128 for braking. Braking step S128 involves turning the torque instruction in the motor drive subroutine negative. Namely, if the q-axis current is set to be negative, the motor 4 goes into braking operation. In this stage, however, an appropriate d-axis current needs to be provided in order to prevent a back electromotive force from causing regenerative power in the DC source side, which might result in a high tension DC voltage destroying power semiconductor devices in the rectifier circuit 2 and the inverter circuit 3.

FIG. 6 is a flow chart of a motor drive subroutine. The subroutine starts at step S200. Step S201 is the initial setting performed at the beginning of execution of the subroutine, where the parameter exchange with the main routine and various other settings are made, and then the subroutine proceeds to S202 for initiating the revolution start control. The steps S201 and S202 are executed only once at the start.

The start control is performed by applying a certain voltage to a motor for 120° at the initial stage, where revolution speed feedback control is impossible. It provides a soft start by starting with a low voltage and gradually raising the voltage along with the lapse of time.

Then at S203, whether or not there is an interrupting carrier signal is determined. The interrupting carrier signal arises when carrier counter at PWM control means 65 overflows and generates an interruption signal ck. If there is an interruption signal ck, the subroutine proceeds to S204 to execute a carrier signal interruption subroutine.

Figure 7:
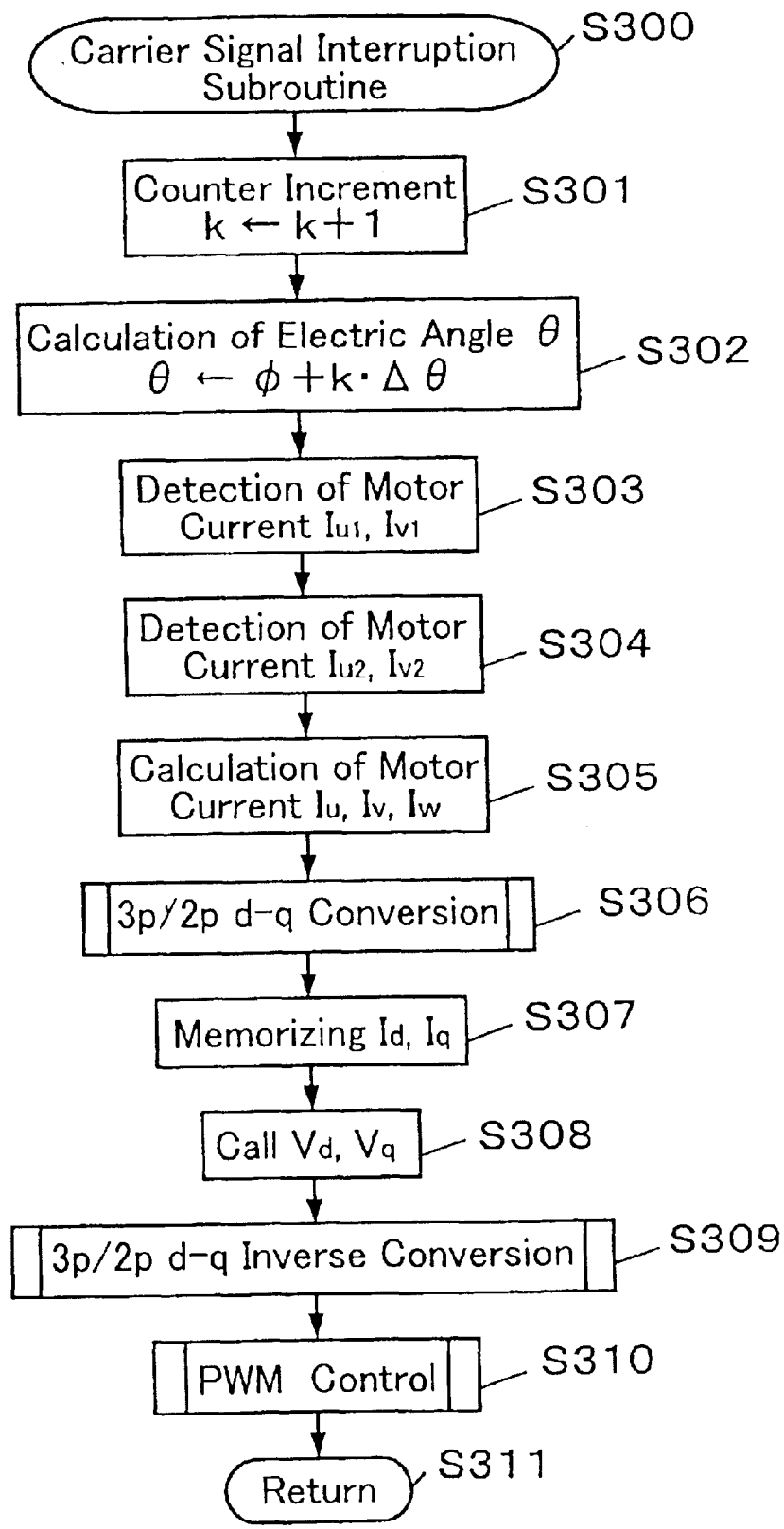
FIG. 7 is a flow chart used to describe the operation of a carrier signal interruption subroutine in the washing machine motor drive device in the first embodiment.

The carrier signal interruption subroutine is shown in detail in a flow chart in FIG. 7. Referring to FIG. 7, the subroutine starts at S300, and counts the interruption signal ck at S301. Then at S302, the subroutine calculates the rotor position electric angle θ. The rotor position signal θ is obtained through an inference, by adding a value k·Δθ, which has been made available separately by multiplying an electric angle Δθ for one carrier signal cycle with a count value k of carrier counter, and the electric angle φ detected by the rotor position detector 4a at each 60°.

Assuming that the motor 4 is an 8-pole motor, the carrier frequency is 15.6 kHz, the revolution speed is 900 r/m, the motor driving frequency becomes 60 Hz and the count value k of carrier counter within electric angle 60° becomes approximately 43. Accordingly, the Δθ is approximately 1.4°. Since the count value k within electric angle 60° increases and the processing capability for detecting and defining the electric angle improves at a lower revolution speed of a motor, it can be understood that the present processing works well even in a case where the revolution speed is low and the required level of precision is high.

Now at S303, motor currents Iu, Iv are detected. If the current is detected only once, there remains a possibility of a noise contained therein. So at S304, the current detection is performed once again. At S305, the mean value is provided in order to remove the noise, and motor current Iw is calculated in accordance with a formula, Iw=−(Iu+Iv).

At S306, the calculation as shown in (formula 1) is conducted from the electric angle θ and the motor current, and the three-phase/two-phase d-q conversion is made to yield the d-axis current Id, the q-axis current Iq. Then at S307, the Id, Iq are stored in a memory to be used separately as data for revolution speed control.

At S308, the d-axis control voltage Vd and the q-axis control voltage Vq are called, and then at S309 the two-phase/three-phase d-q inverse conversion is performed as per the (formula 2) to yield the three-phase control voltages vu, vv, vw. The inverse conversion is performed in the same way as in S306, using the data of sin θ, cos θ corresponding to electric angle stored in memory unit 63, by sum and integration at high speed. At S31, the PWM control is performed corresponding to the three-phase control voltages vu, vv, vw, and then at S310 the carrier signal interruption subroutine is returned.

The PWM control, as described earlier referring to FIG. 2, compares the sawtooth (or triangular) carrier signal with the control voltages vu, vv, vw, corresponding to each of the U-phase, V-phase, W-phase, to generate IGBT on/off control signal of inverter circuit 3, for applying a sinusoidal wave drive to the motor 4. The waveform of signals in the upper arm transistor and lower arm transistor is reversed with respect to each other. When the conduction ratio is increased with the upper arm transistor, the output voltage increases in positive voltage, and when the conduction ratio of the lower arm transistor is increased, the output voltage increases in negative voltage. At the conduction ratio of 50%, the output voltage becomes zero.

When the control voltage is changed in the sinusoidal waveform in correspondence to electric angle θ, electric current of sinusoidal waveform flows. In the case of sinusoidal waveform driving, the output voltage reaches the highest with the rate of modulation Am 100% when the conduction ratio of transistor is made to be the maximum 100% and the output voltage becomes the lowest with the rate of modulation Am of 0% when the highest value of the conduction ratio is made to be 50%.

After the carrier signal interruption subroutine shown in FIG. 7 is executed, the motor drive subroutine shown in FIG. 6 is returned to, and proceeds to S205 where judgement is made as to whether or not there is an interruption of position signal. When either one of the position signals H1, H2, H3 is changed, an interruption signal is generated, and the subroutine proceeds to S206 to execute the position signal interruption subroutine shown in FIG. 8. The interruption signal is generated at each electric angle 60°, as shown in FIG. 2.

Figure 8:
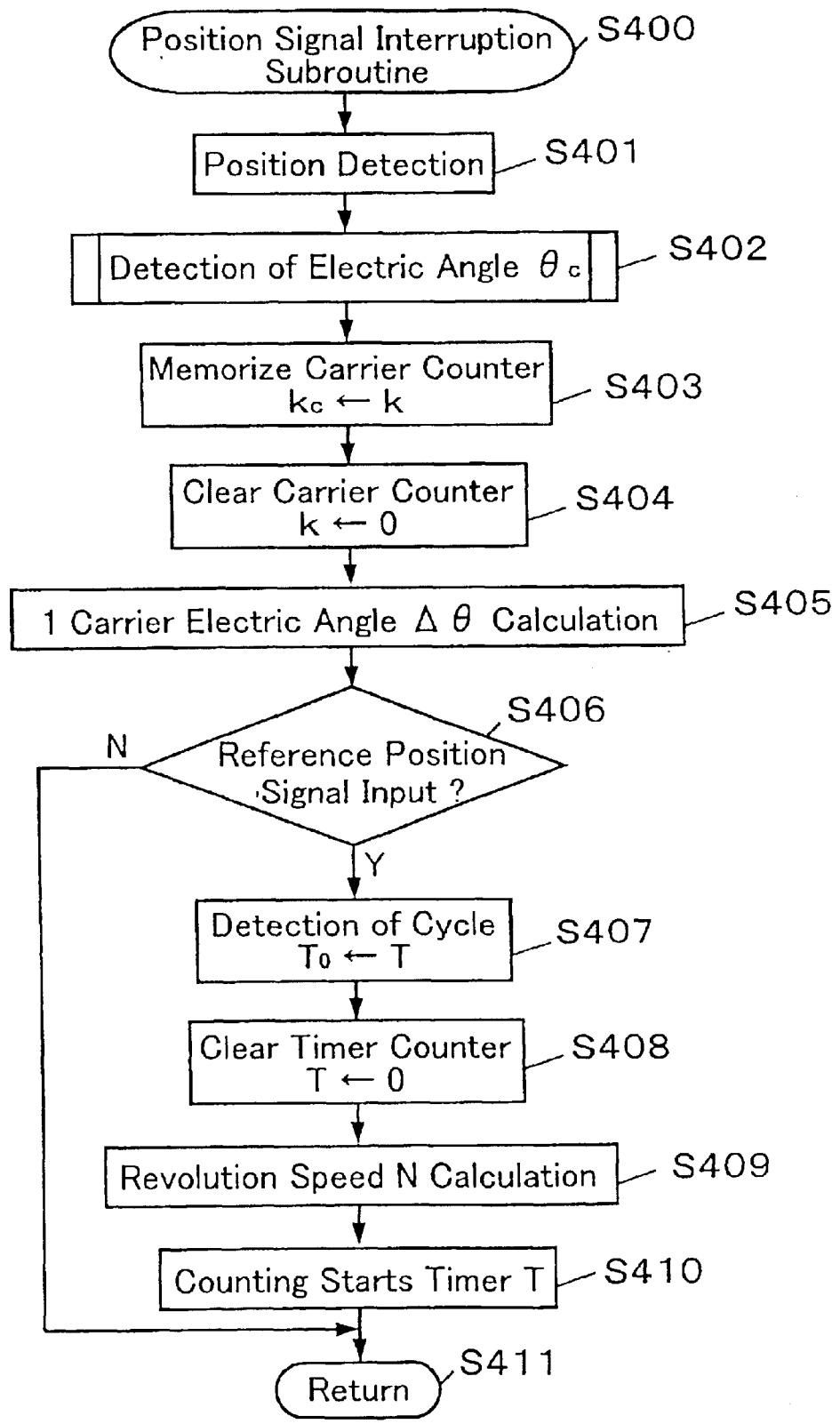
FIG. 8 is a flow chart used to describe the operation of a position signal interruption subroutine in the washing machine motor drive device in the first embodiment.

Now reference is made to FIG. 8 where a position signal interruption subroutine starts at S400. At S401, position signals H1, H2, H3 are input, and at S402 rotor electric angle θc is detected from the position signal. At S403, the count value k counted by the carrier signal interruption subroutine is memorized in kc, then at S404 the count value k is cleared, and then at S405 electric angle Δθ of one carrier is calculated from the carrier counter count value kc in the electric angle 60°.

At S406, judgement is made as to whether it is an interruption signal by the reference position signal H1. If it is the reference position signal, the subroutine proceeds to S407 where the count value T of a revolution cycle measuring timer is memorized as cycle To. And then at S408, the timer T is cleared, and number of motor revolutions N is calculated at S409. At S410, counting at the revolution cycle measuring timer is started, and at S411 the position signal interruption subroutine is returned.

Assuming the capability of detecting and defining in the revolution cycle measuring timer to be at precision level 8 bit, the clock becomes 64 µs, so the carrier signal can be used for the clock. In order to improve the capability of revolution control, the capability of detecting and defining the revolution cycle needs to be raised, and the clock cycle needs to be set at somewhere within a range 1–10 µs. In this case, the system clock of the microcomputer may be divided for use as the clock.

After the position signal interruption subroutine of FIG. 8 is executed, the motor drive subroutine shown in FIG. 6 is returned to for executing a revolution speed control subroutine at S207. Details of the revolution speed control subroutine are shown in FIG. 9.

Figure 9:
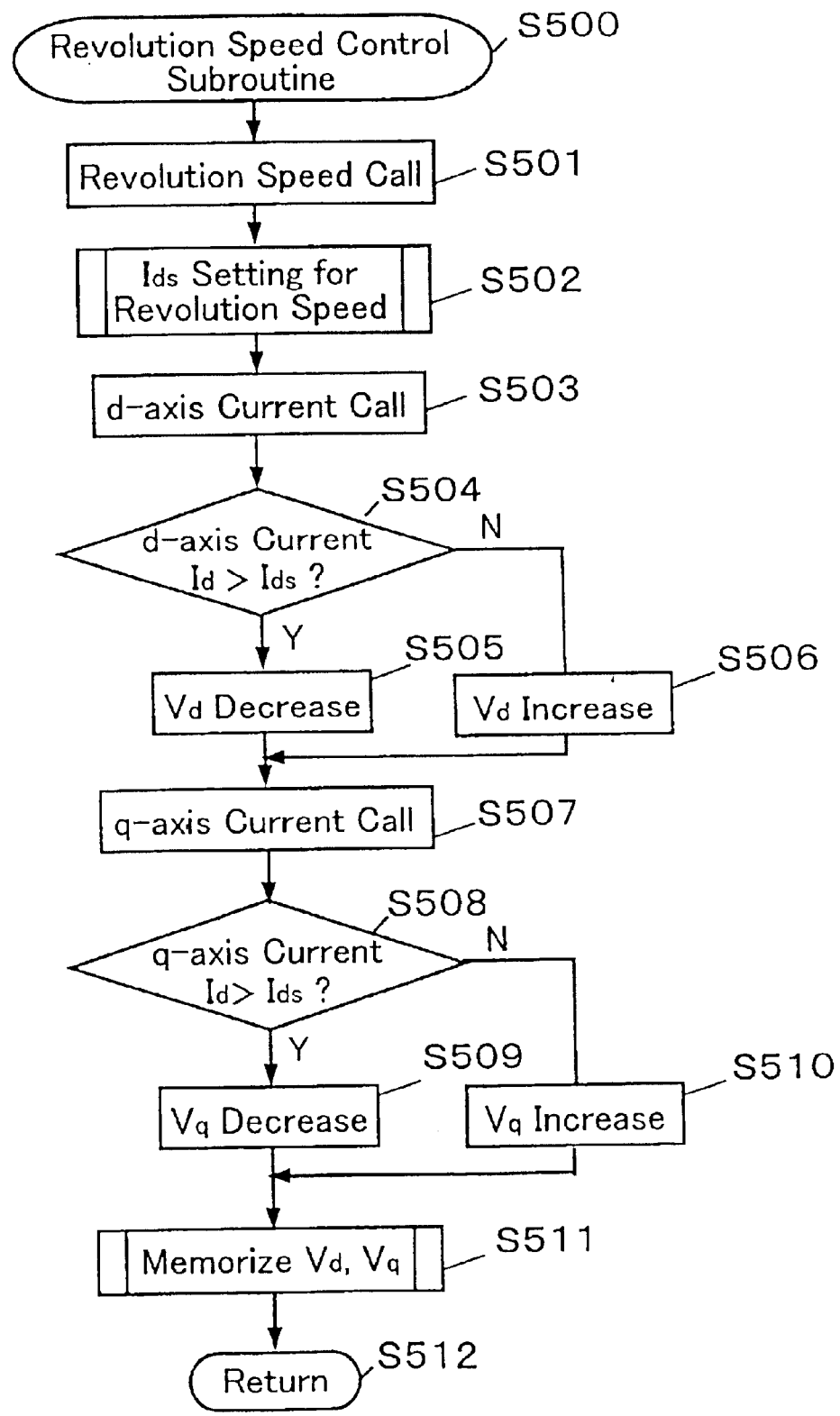
FIG. 9 is a flow chart used to describe the operation of a revolution speed control subroutine in the washing machine motor drive device in the first embodiment.

Referring to FIG. 9, a revolution speed control subroutine starts at S500, the number of motor revolutions N is called at S501, and then at S502 the d-axis current value Ids is specified in accordance with number of revolutions. A relationship between the number of motor revolutions and the d-axis current –Ids is on the graph shown in FIG. 10. At a low revolution speed, the d-axis current value –Ids is set at zero; in a revolution speed higher than a certain specific value, the Ids is increased in the negative direction in accordance with the number of revolutions.

The number of motor revolutions may either be a detected revolution or a specified revolution. However, the control stability is improved when the d-axis current specified value Ids is increased in the negative direction in accordance with specified number of revolutions Ns. Namely, in a case where the –Ids is increased in accordance with detected revolution speed, the –Ids increases along with increasing number of revolutions, and the increased –Ids causes an increased revolution speed. So, in a case of a small load, the revolution speed control is feared to go out of control.

At S503, the d-axis current Id obtained at three-phase/two-phase d-q converter 61 is called, and at S504, large/small of the Id and Ids is compared. If the d-axis current Id is judged larger than the specified value Ids, the subroutine proceeds to S505 to have the d-axis control voltage Vd decreased; if the d-axis current Id is judged smaller than the specified value Ids, the subroutine proceeds to S506 to have the d-axis control voltage Vd increased.

At S507, the q-axis current Iq obtained at three-phase/two-phase d-q converter 61 is called, and at S508, large/small of the Iq and Iqs is compared. If the q-axis current Iq is judged larger than the specified value Iqs, the subroutine proceeds to S509 to have the q-axis control voltage Vq decreased; if the q-axis current Iq is judged smaller than the specified value Iqs, the subroutine proceeds to S510 to have the q-axis control voltage Vq increased. Next at S511, the calculated d-axis control voltage Vd and q-axis control voltage Vq are memorized respectively, and then at S512 the revolution speed control subroutine is returned.

Since the d-axis current Id and the q-axis current Iq are converted at approximately each carrier signal, there is a large fluctuation, including torque ripple. If the converted d-axis current Id and the converted q-axis current Iq are compared to the specified values of Ids and Iqs at each carrier, there will be too many fluctuation factors, which would lead to an instability of control. Therefore, averaging or like concept of integration needs to be added to.

Because of the above reason, the revolution control subroutine S207 is not executed in the carrier signal interruption subroutine S204, or the position signal interruption subroutine S206, but is executed independently in a motor drive control subroutine as shown in FIG. 6. For the purpose of a quicker response in the revolution control, it may be considered to have the subroutine executed in a position signal interruption subroutine. However, it is to be noted that the response speed might turn out to be slow in a case where the revolution speed is low.

Figure 10:
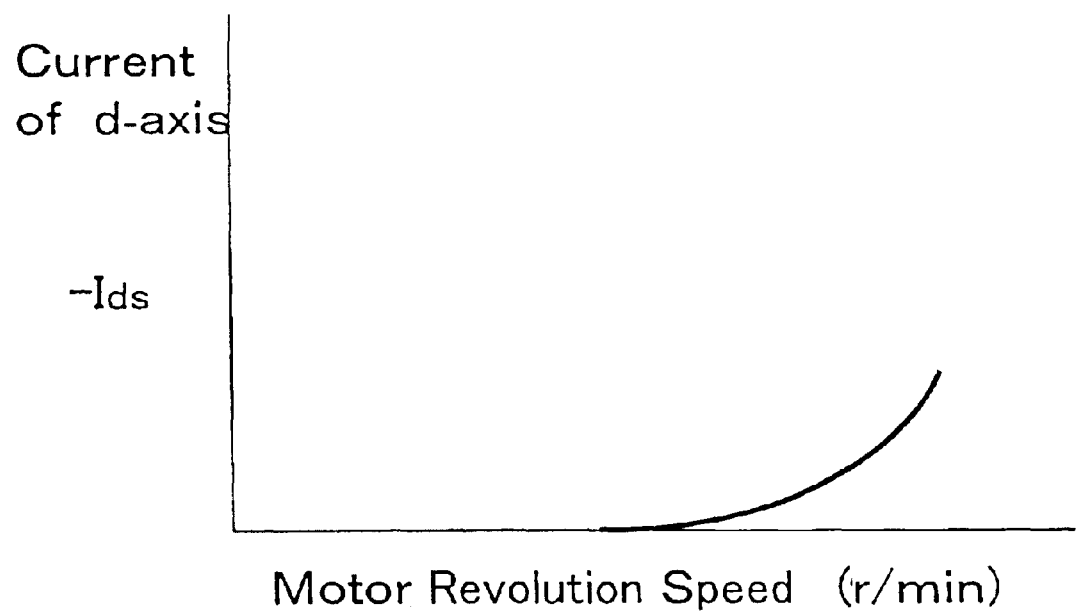
FIG. 10 is a chart showing the relationship between motor revolution speed and current of d-axis Ids in a washing machine motor drive device in a first embodiment.

Referring to FIG. 10, when the d-axis current specified value –Ids is increased in accordance with the specified revolution speed, it becomes a flux-weakening control at high speed revolution. So, the torque can be increased by increasing a motor current. During high speed revolution for dehydration, among other operations, the number of spinning revolutions can be specified to be high by increasing the d-axis current specified value –Ids. This leads to a higher rate of dehydration.

In order to specify the revolution speed to also be high for a washing-agitation operation, the d-axis current specified value –Ids may be increased. This implements a high speed revolution with an increased torque. So, the washing torque can be increased for encountering a high clothes amount. This leads to a higher rate of washing.

As described in the foregoing, since control is performed by specifying the d-axis current value Ids at substantially zero in the low speed revolution region, the operation is conducted at a maximum efficiency; while in the high speed revolution region, the d-axis current value –Ids is specified to be high for a high torque operation. So, the motor efficiency can be improved during dehydration operation or washing operation.

Figure 11:
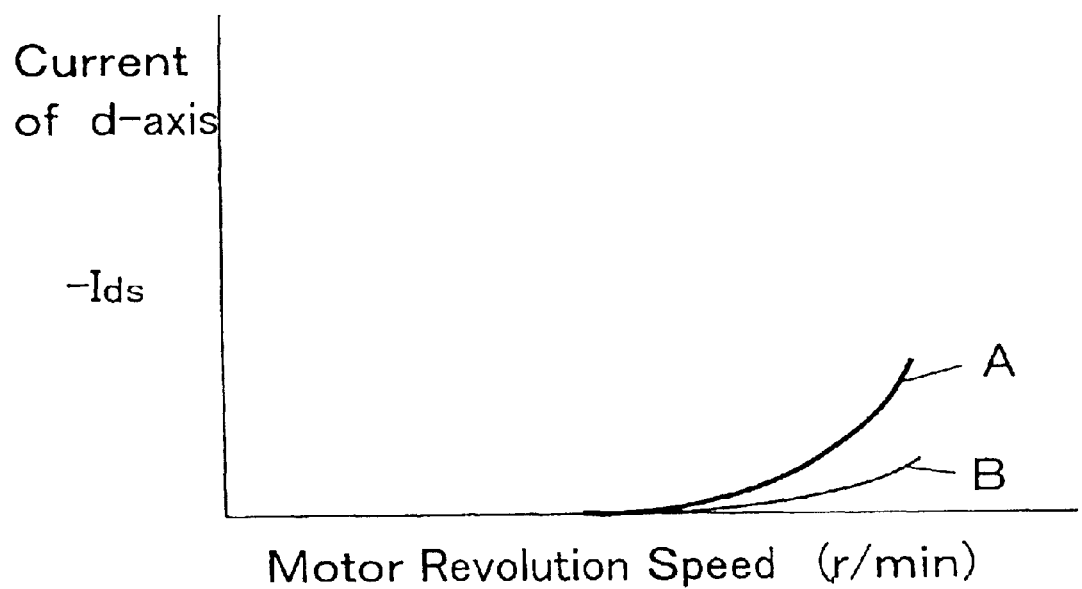
FIG. 11 is a chart showing the relationship between motor revolution speed by clothes amount and current of d-axis Ids in the washing machine motor drive device in the first embodiment.

FIG. 11 shows a case where the d-axis current specified value –Ids, which corresponds to revolution speed, is varied in accordance with the amount of clothes. Curve A represents a case where the clothes amount detector 69 judged that the amount of clothes is large, while curve B represents a case where the clothes amount is small. Where there is high amount of clothes, a high torque is needed; so, the d-axis current specified value –Ids is increased at high speed revolution. While such a high torque is not needed in a case of lower clothes amount; so, the increase rate for the d-axis current specified value –Ids is lowered to decrease the torque. Thus, the damage on clothes is alleviated, and the motor efficiency is increased.

The daily amount of laundry in an average household is within a range of 2–4 kg. So, the motor 4 can be controlled at high efficiency by lowering the d-axis current specified value –ds. Thus, heat generation of motor 4 is reduced, to the contribution to energy conservation.

Figure 12:
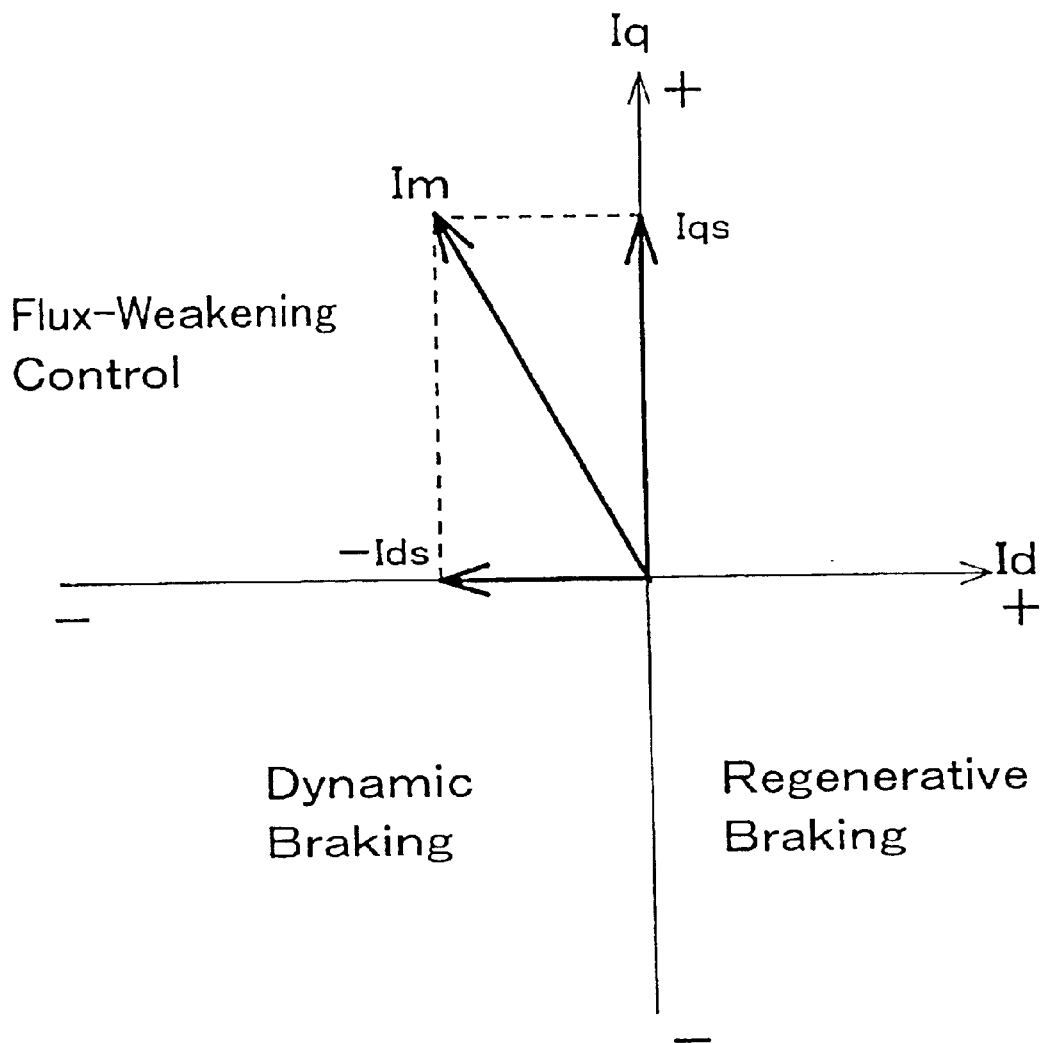
FIG. 12 is a vector diagram showing a motor current resolved into d-axis current and q-axis current.

FIG. 12 is a vector chart of motor current Im, resolved into d-axis current and q-axis current. This shows a flux-weakening control where the d-axis current is increased in the negative direction, namely a so-called control by angle of advance. The –Ids, Iqs respectively represent specified values for the vector control. The q-axis current in the negative works as a brake; generally, in a case where Iq is negative while Id is positive, it becomes a regenerative brake where a back electromotive force is caused in the DC source side, and when both the Iq and the Id are negative, it becomes a dynamic brake where the back electromotive force is consumed by the internal resistance of a motor.

Thus, by resolving it into the d-axis current and the q-axis current and specifying appropriate values for the Ids and Iqs to facilitate the vector control, the braking control and the control of back electromotive force become easy.

As described in the foregoing, a washing machine motor drive device in accordance with a first embodiment of the present invention detects motor current of a DC brushless motor, resolving it into a current component corresponding to magnetic flux and a current component corresponding to torque for facilitating the vector control. In low speed revolution, the control is exerted mainly on the current component corresponding to torque, maximizing the efficiency of control, while in high speed revolution, the current component corresponding to magnetic flux is increased in the negative direction for the flux-weakening control, thereby increasing the current to facilitate the maximized torque control. The motor characteristics are improved and the efficiency in washing operation is raised. This enables the downsizing of a motor.

The load for driving an agitator of washing machine, among other operations, is almost identical to that caused by a fluid, which means that the torque goes higher along with the increasing revolution speed, and the agitator might stop its operation at a high speed revolution, if it followed a conventional concept of control. However, in the vector control where a high torque is available even at a high speed revolution, the washing rate can be improved. Also, in the dehydration operation, the high torque can drive a washing/spinning tub at a high revolution speed; so, even a small motor can attain a high rate of dehydration.

Embodiment 2

Figure 13:
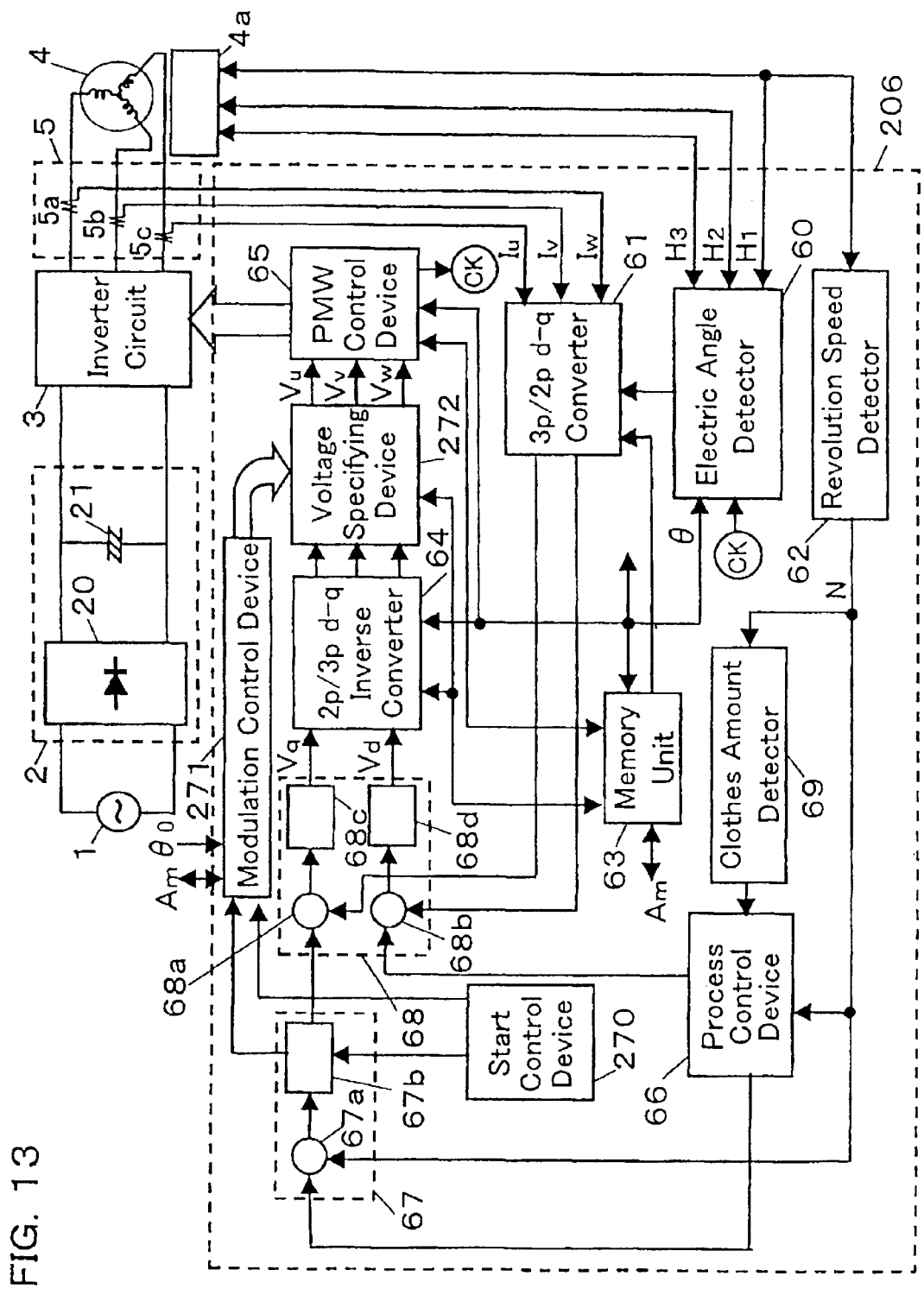
FIG. 13 is a block diagram showing the structure of a washing machine motor drive device in accordance with a second exemplary embodiment of the present invention.

FIG. 13 is a block diagram showing the structure of a washing machine motor drive device in accordance with a second exemplary embodiment of the present invention. The point of difference from the first embodiment shown in FIG. 1 is that the control device 6 of embodiment 1 is replaced with a control device 206, which control device further comprising a start control device 270, a modulation control device 271 and a voltage specifying device 272.

Referring to FIG. 13, the start control device 270 specifies various initial values at the start of motor revolution, and switches the soft starting to a feedback control. At the start, the start control device 270 provides the motor 4 with a certain specific voltage to have the revolution started, and then after the motor has reached a certain revolution, or revolution of a certain specific electric angle, it provides a feedback control. The modulation control device 271 controls, at the start of revolution, direct on the modulation Am of voltage applied to the motor, the motor induction voltage Ec and the phase $\theta a$ of the voltage applied to motor. The voltage specifying device 272 controls, at the start, direct on the voltage control signals Vu, Vv, Vw to the PWM control device 65. The rest of the structure remains the same as that in the embodiment 1; so, the same constituent elements are identified by providing the same symbols and overlapping descriptions are omitted.

Figure 14:
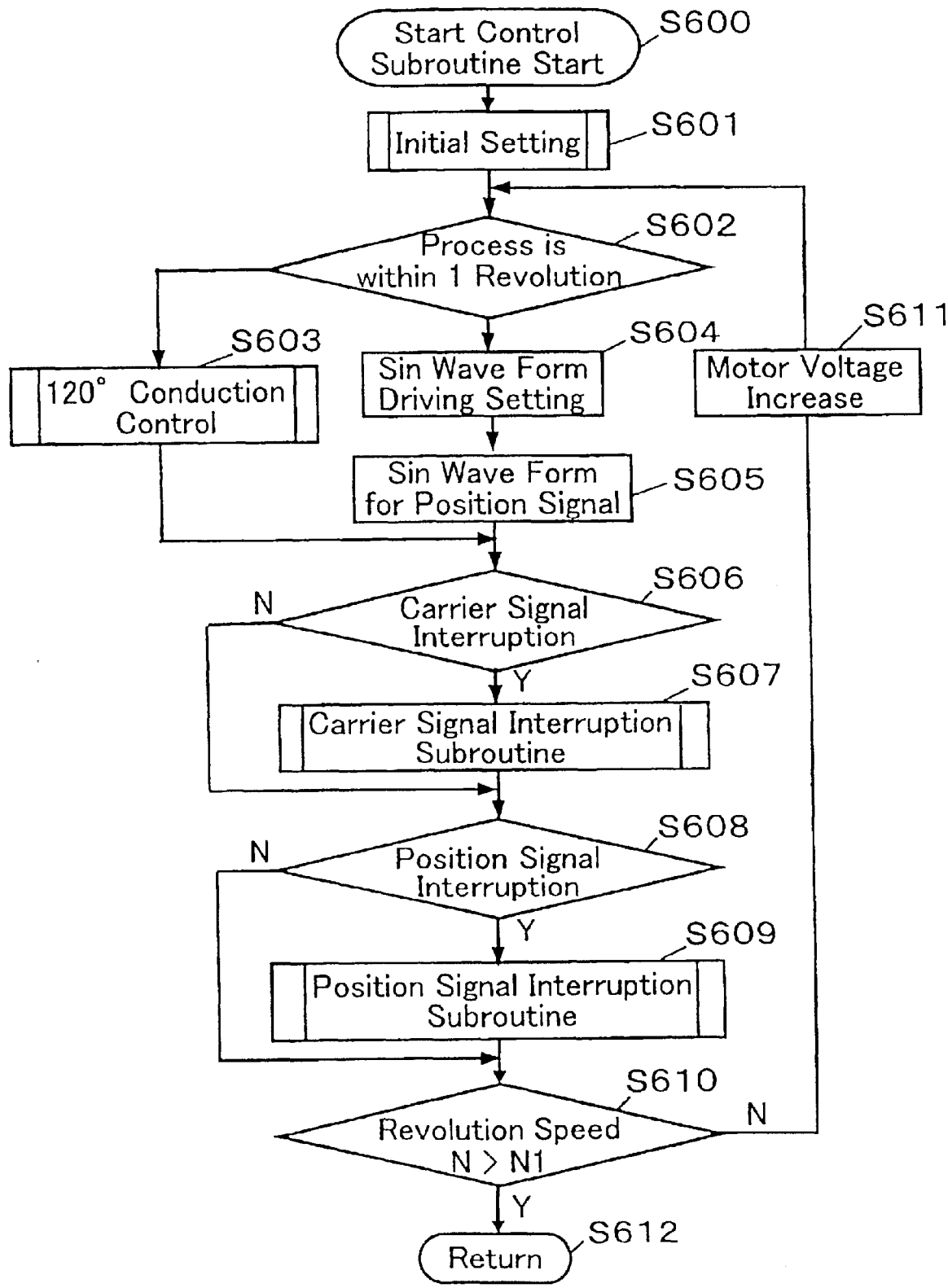
FIG. 14 is a flow chart used to describe the operation of a start control subroutine in the washing machine motor drive device in the second embodiment.

The operation of the above-configured washing machine motor drive device in a second embodiment is described below. FIG. 14 shows a start control subroutine used to describe the operation and the control performed by the start control device 270 which has been added in the present embodiment 2. It shows the contents of control from detection of q-axis current Iq and the d-axis current Id to the feedback control. The step S202 of motor drive subroutine shown in FIG. 6 is replaced with the present start control subroutine.

Referring to FIG. 14, the start control subroutine starts at step S600, various initial settings such as initial application voltage are made at S601, and whether the processing is done within one revolution of a rotor or more than one revolution is judged at S602. If judged to be within one revolution, the subroutine proceeds to S603 to perform a square-wave driving, so called a 120° conduction control, in accordance with the signal from the rotor position detector 4a. This is because the 120° conduction control can provide a greater torque; since at immediately before and after the revolution start, it is difficult to make an inference about position between the position signals generated at every 60°.

If it is judged to be more than one revolution of a rotor, the subroutine proceeds to S604 for a sinusoidal wave driving, and then at S605, the subroutine applies an output voltage of sinusoidal wave output corresponding to rotor position signal. Timing between the position signal and the output voltage is as shown in the waveform of FIG. 2; it is substantially the same as the motor induction voltage Ec, or even when it is slightly ahead, the electric angle $\theta a$ forcedly applies the voltage waveform within 30°.

Then at S606 the subroutine judges whether or not there is an interruption of carrier signal; if there is an interruption signal, the subroutine proceeds to S607 to execute a carrier signal interruption subroutine, if not the subroutine proceeds to S608 for a judgement as to whether or not there is an interruption of position signal. If there is an interruption signal, the subroutine proceeds to S609 to execute a position signal interruption subroutine, if not, the subroutine proceeds to S610 for a judgement as to whether or not revolution speed has reached a certain specific revolution speed N1.

If the revolution speed N1 has not been reached, the subroutine proceeds to increase the transistor conduction ratio for increasing the sinusoidal wave modulation ratio, or in the case of 120° conduction control, the voltage applied to the motor is raised through an increased power supply ratio with the transistor. If it is higher than the specified revolution speed N1, the subroutine proceeds to S612 to return to the subroutine.

When a vector control is introduced above a certain specific revolution speed, it turns out to be unnecessary to expand the frequency characteristic of current detector 5 up to the DC component, and an inexpensive AC transformer is usable. This leads to a substantial cost reduction as compared to the use of a DC transformer. In addition, a soft start of smooth control of starting current can be introduced; as a result, the DC component due to excessive response is hardly observed and the d-axis current and the q-axis current can be detected by an AC transformer at a satisfactory precision level.

The carrier signal interruption subroutine S607 is substantially identical to that in FIG. 7; however, S307 and S308 are unnecessary. The rotor position electric angle is inferred at each carrier signal, the three-phase/two-phase d-q conversion is performed to obtain the d-axis current and the q-axis current, and the data are stored in memory. If it is possible to specify the Vd and Vq so that the motor induction voltage EC and the output voltage after two-phase/three-phase d-q inverse conversion share a substantially same phase, the flow chart may be used as it is. The position signal interruption subroutine S609 remains the same as that shown in FIG. 8.

The contents of control after being shifted to a vector control after the start control subroutine is returned to remain the same as those described in the embodiment 1; it controls the d-axis current in accordance with revolution speed. It shifts to vector control using the d-axis current and the q-axis current obtained through the three-phase/two-phase d-q conversion. The conversion of d-axis current and q-axis current can be made at each carrier frequency; however, in view of much fluctuating elements, it requires the electric angle for at least one cycle (360°).

Although in the present embodiment, description has been made on the example where the start control subroutine is withdrawn after the revolution speed reached a specified level response speed of the control can be raised by shifting to a vector control after at least 360° electric angle after the transition to sinusoidal wave driving. By so doing, advantages of the vector control reveal themselves as being more significant.

When shifting from the 120° conduction contorol to the sinusoidal wave is specified at double the 360° in electric angle, and then the shifting from the constant modulation sinusoidal wave drive to vector control is specified at 360°, the transition to vector control can be made at triple the 360° in electric angle. The unit of control in this case is the electric angle. In an 8-pole DC brushless motor, for example, since the electric angle 360° quadrupled is equal to one rotor revolution, the shifting to vector control is finished in a ¾ revolution. This enables a high speed revolution control at the starting.

A higher-speed response control may be implemented by making an inference of revolution speed based on interruption signal at each 60°. This, however, may accompany substantial revolution speed error due to a dislocated hall IC; so, it is advised to use a reference hall IC for calculating the revolution speed; namely, a revolution speed detection at each electric angle 360° is superior in view of less errors.

As described in the foregoing, a washing machine motor drive device in accordance with second embodiment of the present invention resolves, like in the embodiment 1, detected motor current into a current component corresponding to magnetic flux and a current component corresponding to torque for facilitating a vector control. By so doing, the motor characteristics are improved, efficiency of the washing operation is raised and the motor can be downsized. When driving an agitator of a washing machine, a superior torque is provided even at a high speed revolution, thanks to the vector control. Also in the spinning operation, a washing/spinning tub can be driven at a high revolution speed. Thus, even a small motor can achieve a high dehydration ratio.

Furthermore, by applying, at the starting of a motor, a certain specific voltage and then resolving the motor current into a current component corresponding to magnetic flux and a current component corresponding to torque, and then shifting to a current feedback control by vectorial control after a specified revolution speed, or a specified revolution angle, is reached, a smooth torque control can be implemented, and a possibility of overshooting in the revolution speed control or an abnormal revolution can be reduced. This contributes to alleviating damage to clothes.

Furthermore, an AC transformer can be used for the current detector 5. This contributes to implementing an expensive washing machine motor drive device.

Embodiment 3

Figure 15:
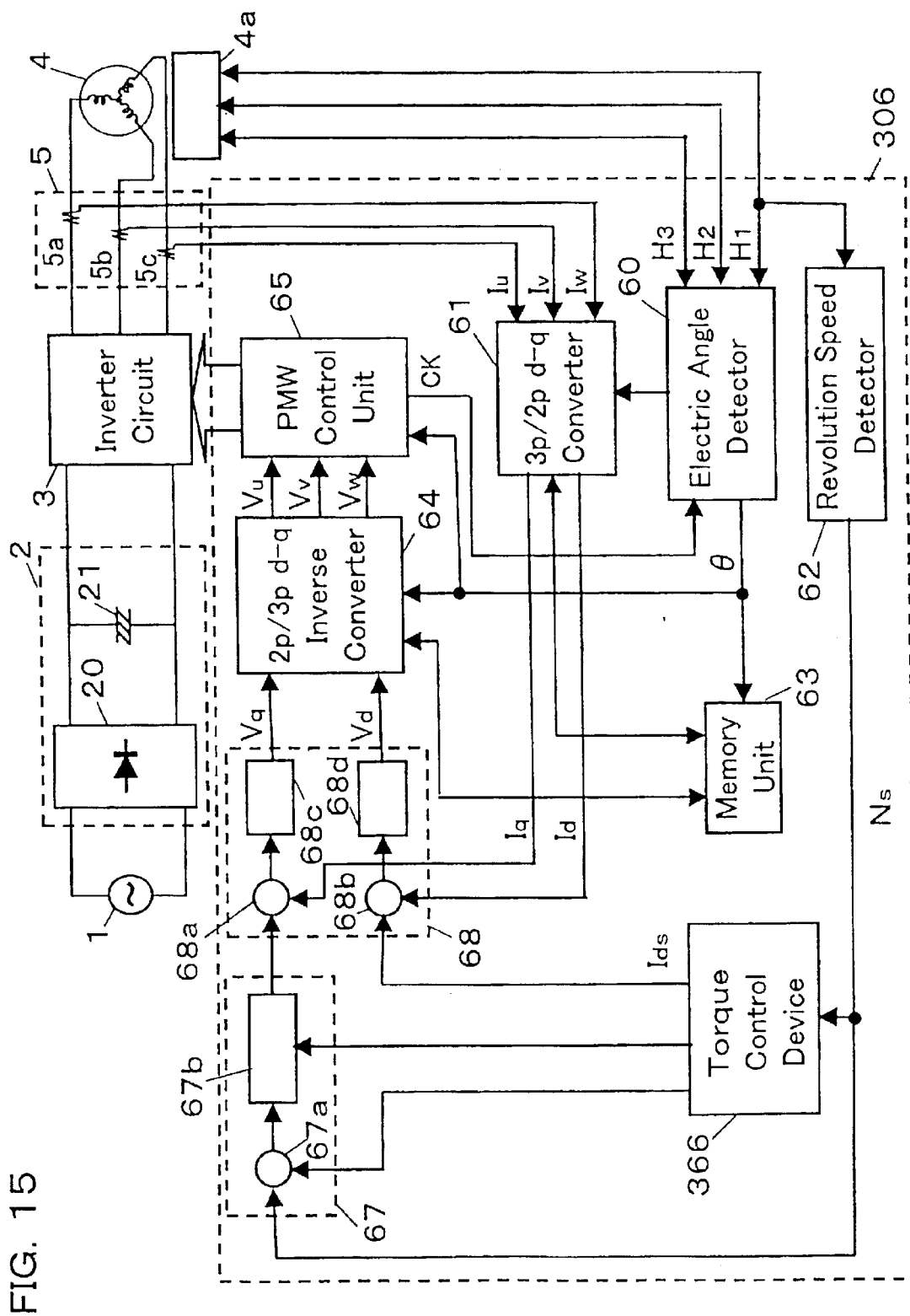
FIG. 15 is a block diagram showing the structure of a washing machine motor drive device in accordance with a third exemplary embodiment of the present invention.

FIG. 15 is a block diagram showing the structure of a washing machine motor drive device in accordance with a third exemplary embodiment of the present invention. The most significant point of difference from the first embodiment shown in FIG. 1 is that the clothes amount detector 69 and the process control device 66 in the control device 6 have been eliminated, while a torque control device 366 has been added for forming a control device 306 of the present third embodiment.

The point of significance with a washing machine motor drive device in embodiment 3 is that it comprises a torque control device 366. A brief description on the torque control device 366 is given below.

Control device 306 comprises a torque control device 366 for controlling revolution speed and torque of motor 4 according to whether the motor 4 is in a washing stage or a dehydration stage, a revolution speed control device 67 for controlling the revolution speed of motor 4 in accordance with output signal from the revolution speed detector 62, and a motor current control device 68 for comparing the d-axis current specifying signal Ids and the q-axis current specifying signal Iqs from torque control device 366 and revolution speed control device 67 with the Id and the Iq calculated by the three-phase/two-phase d-q converter 61, thereby calculating a voltage component Vd corresponding to magnetic flux and a voltage component Vq corresponding to torque for controlling the motor current. As compared with the control device 6 in the first embodiment, there is not much difference in the signal exchange, etc., except that the process control device 66 was replaced by a torque control device 366. The rest of the structure remains the same as that in the embodiment 1. So, the same constituent elements are represented by using the same symbols, and descriptions of which elements are omitted here.

A constant torque control is possible by introducing a feedback control so that the q-axis current Iq corresponding to torque coincides with specified value Iqs. When revolution speed goes higher, the motor induction voltage rises and the torque current Iq stops increasing. So, the q-axis current can to be increased by increasing the d-axis current in the negative direction in accordance with the revolution speed. The above-described function of increasing the torque remains the same as that described in the embodiments 1 and 2.

For retarding the revolution, the q-axis current Iqs may be specified in the negative value for generating a negative torque, or a braking torque. Since the braking torque can be controlled to be constant through vector control, a control program may be shared in common by the normal driving operation and the braking operation; then, the control program works by simply changing the q-axis current specifying value Iqs and the d-axis current specifying value Ids. A revolution speed feedback control on the q-axis current minor loop may be provided for the normal driving; while for the braking, the specified revolution count is zero, and a q-axis current feedback control may be provided.

However, attention has to be paid so that the d-axis current is controlled in accordance with the revolution speed. Otherwise, regenerative energy is generated to an abnormal rise in the inverter DC voltage, which voltage increase would be ill-affecting the power semiconductor device or the electrolytic capacitor 21.

A washing machine motor drive device in the present embodiment 3 works, during normal driving, on the substantially same waveform relationship as described in the embodiment 1 with reference to FIG. 2. Therefore, detailed description of which is omitted here to avoid duplication.

Figure 16:
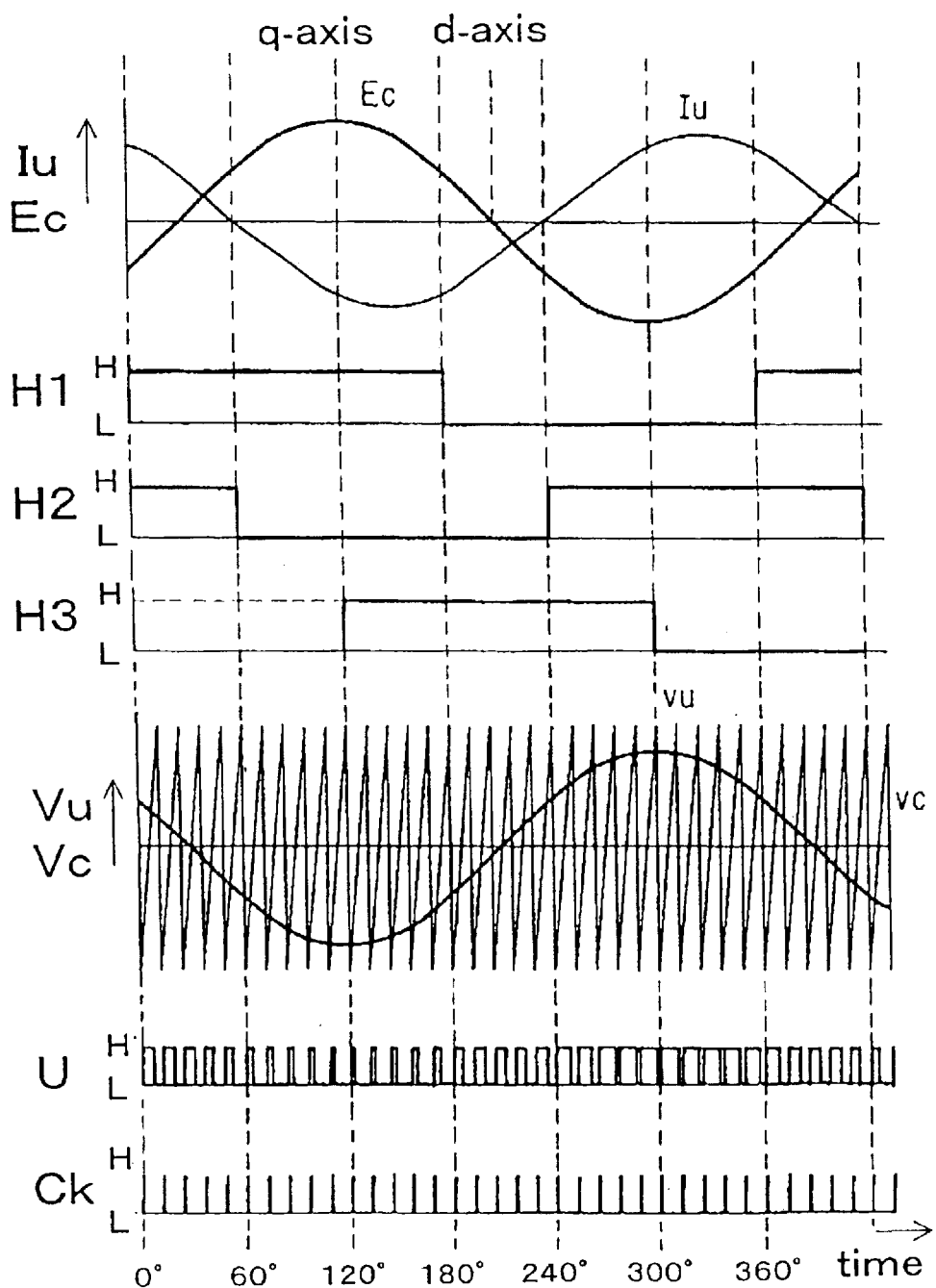
FIG. 16 is a timing chart used to describe the braking operation of the washing machine motor drive device in the third embodiment.

FIG. 16 shows waveforms of respective parts at braking operation. Braking torque is generated when the phase of normal driving is shifted by approximately 180°. Namely, when the current is controlled to be maximized in the negative at the q-axis, where the induced voltage Ec reaches the highest, a negative torque is generated for braking operation.

Figure 17:
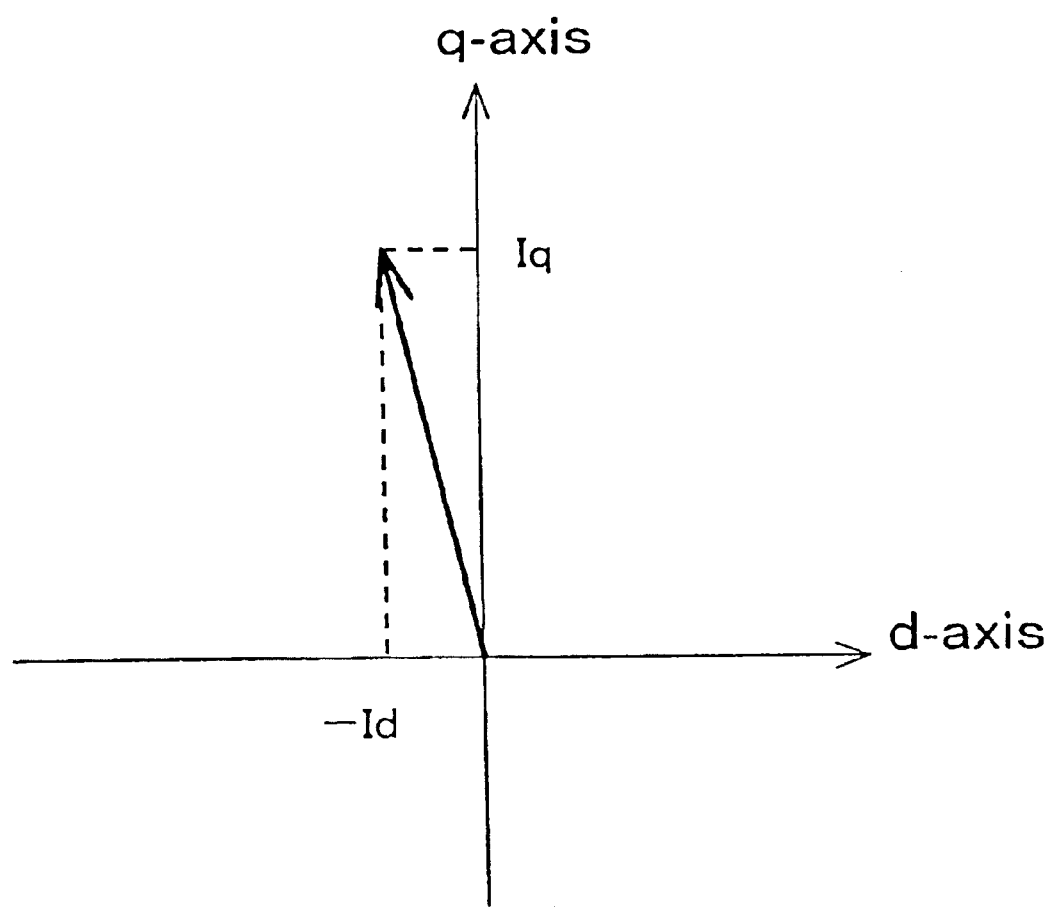
FIG. 17 is a motor current vector diagram showing the normal operation of the washing machine motor drive device in the third embodiment.

FIG. 17 shows a current vector diagram on the d-q coordinate during normal driving; where, the d-axis current is set in the negative for a flux-weakening control. In the case of a non-protruding magnetic motor having a magnet device attached on the surface of rotor, the operating efficiency can be maximized by specifying the d-axis current to be zero.

Figure 18:
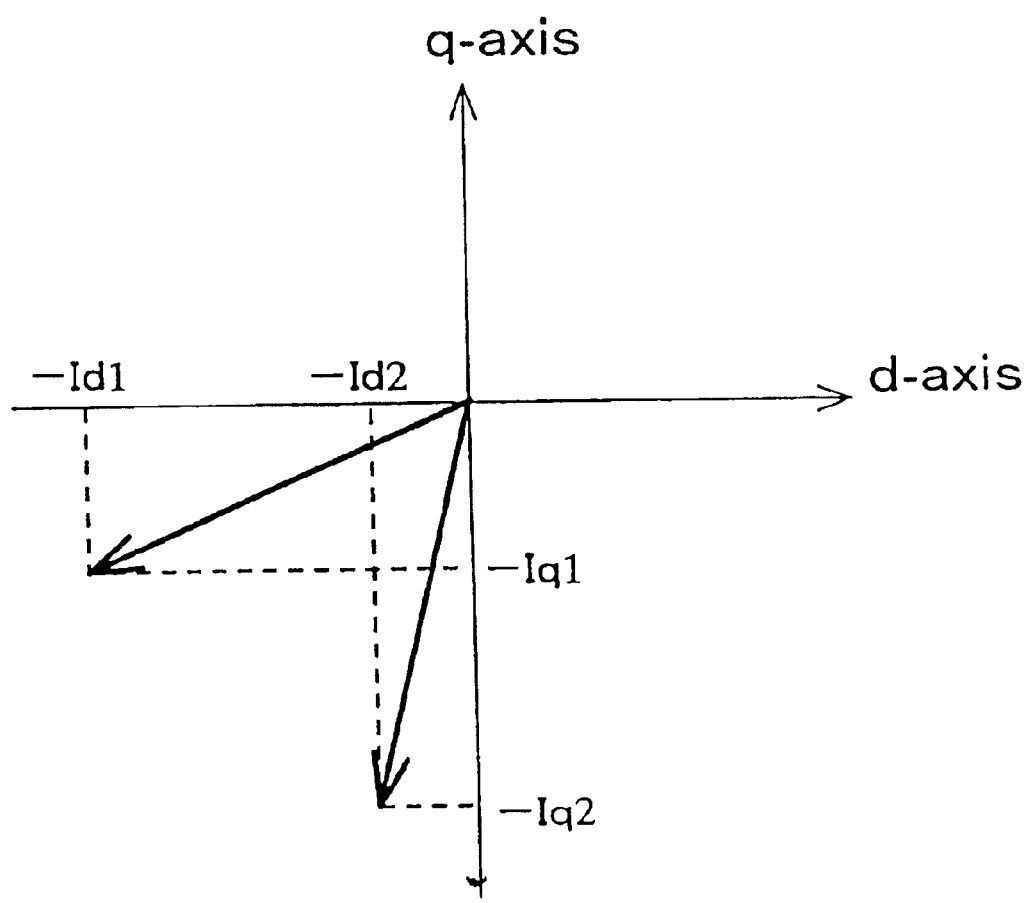
FIG. 18 is a motor current vector diagram showing the braking operation of the washing machine motor drive device in the third embodiment.

FIG. 18 shows current vector at braking operation. Current I1 represents the vector at the beginning of braking, while current I2 represents the vector after the revolution speed is lowered by the braking. At the beginning of the braking operation, the q-axis current and the d-axis current need to be set at the negative, and the d-axis current needs to be greater than the q-axis current; otherwise, a regenerative energy arises. In the region where the d-axis current is positive and the q-axis current is negative, the regenerative energy grows to be too great, so it is almost impossible to have the back electromotive force consumed by the motor coil. Therefore, the braking operation of washing machine should be performed in the region where both of the Id and Iq are in the negative.

The three-phase/two-phase d-q converter 61 of FIG. 15 converts the motor currents Iu, Iv, Iw into a d-axis current Id and a q-axis current in accordance with the (formula 1), in the same way as described earlier in the embodiment 1. The Id and Id are calculated based on instantaneous motor current value detected corresponding to the electric angle θ.

Since the data about amplitude of sin θ, cos θ, and electric angle θ shown in FIG. 3 are stored in the memory unit 63, the data corresponding to electric angle data may be called for the calculation of summing and integration, like in the embodiment 1; thereby, the data can be resolved into d-axis current Id and q-axis current Iq. Detections of the electric angle θ and the instantaneous value of motor current are done in synchronization with carrier signal; a detailed description of which will be made later referring to a flow chart. The reference of electric signal θ is calculated on the basis of the d-axis. Although the electric angle in FIG. 2 and FIG. 16 is based on H1 as the reference, it is actually based on d-axis as the reference. So, the calculation is conducted on an assumption that the low edge of H1 is in advance by an angle of 30°, and the high edge of H3 is making the q-axis and in advance by an angle 90°.

Revolution speed detector 62 detects motor revolution speed from the output reference signal H1 of rotor position detector 4a, and delivers revolution count signal to the torque control device 366 and the revolution speed control device 67. During normal driving operation, the torque control device 366 specifies revolution speed of motor 4 and d-axis current corresponding to revolution speed, and adds revolution speed specifying signal Ns to the revolution speed control device 67, and d-axis specifying signal Ids to the motor current control device 68.

Revolution speed control device 67 is formed of a revolution counts comparison device 67a for comparing the detected number of revolutions N and the revolution speed specifying signal Ns, and a torque current specifying device 67b for controlling the q-axis current specified value Iqs in accordance with an error signal ΔN between revolution counts N and specified revolution counts Ns, as well as rate of revolution speed shift (acceleration). The torque current specifying device 67b controls the q-axis current Iq, which corresponds to torque of motor 4, to meet with the specified value Iqs. For braking operation, it performs a torque control in the negative, not the revolution speed control; specifies the q current value of motor current control device 68 to be a certain specific negative torque current –Iqs, also the d-axis current to be a certain specific value –Ids.

The motor current control device 68 is formed of a q-axis current comparative device 68a, a q-axis voltage specifying device 68b, a d-axis current comparative device 68c and a d-axis voltage specifying device 68d. It delivers control voltage signals Vq and Vd for controlling respectively the q-axis current and the d-axis current, after comparing the output signals Iq and Id from the three-phase/two-phase d-q converter 61 with the specified signals Iqs and Ids, respectively. The two-phase/three-phase d-q inverse converter 64 calculates three-phase motor drive control voltages Vu, Vv, Vw from voltage signals Vq and Vd, in accordance with (formula 2). It adds sinusoidal wave form signal that corresponds to the electric angle θ detected by the electric angle detector 60 to the PWM control device. The method of processing the sin θ and cos θ data stored in the memory unit 63 remains almost the same as that in the three-phase/two-phase d-q converter 61. These functions are identical to those in the embodiment 1.

Figure 20:
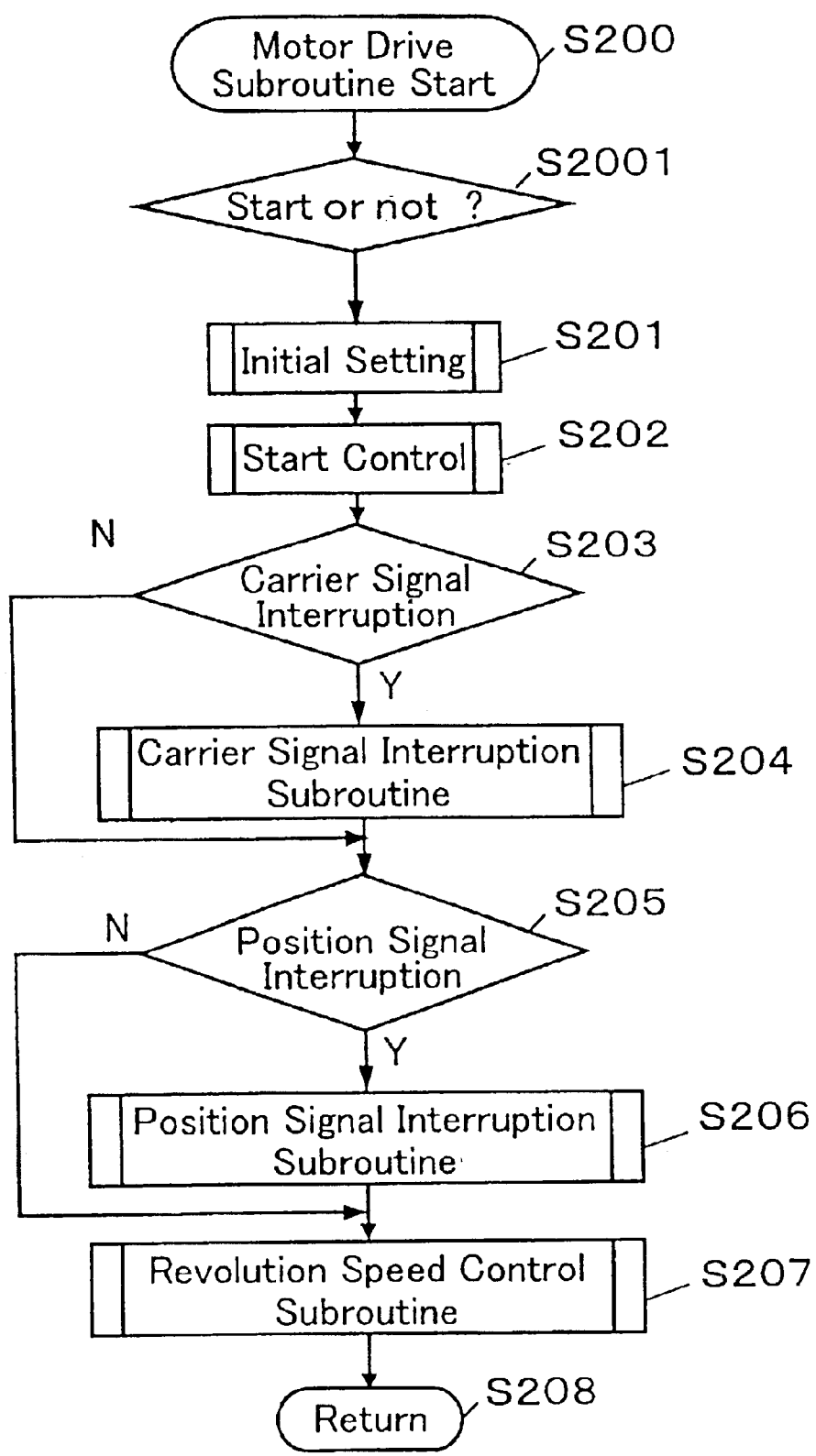
FIG. 20 is a flow chart used to describe the operation of a motor drive subroutine of the washing machine motor drive device in the third embodiment.
Figure 21:
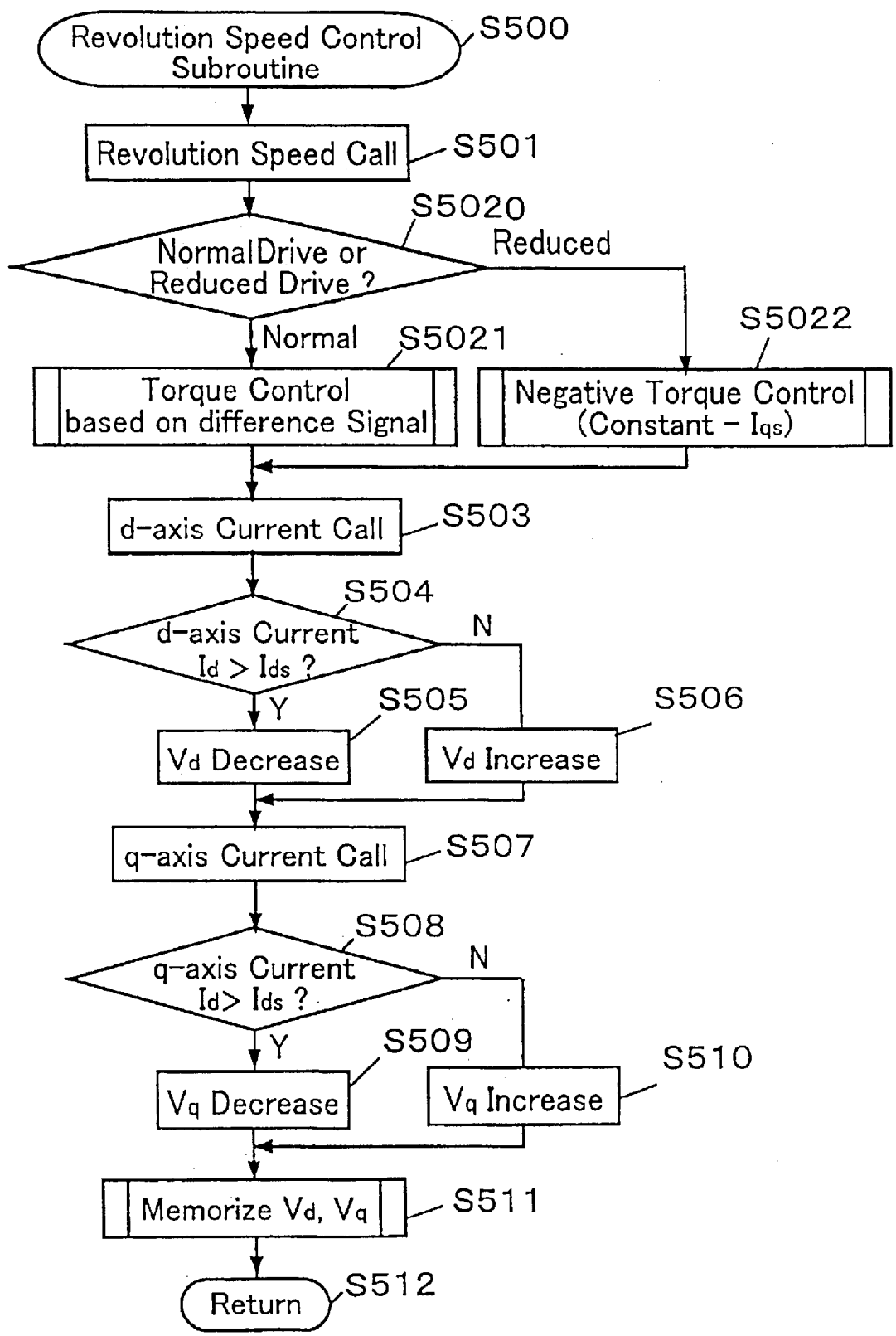
FIG. 21 is a flow chart used to describe the operation of a revolution speed control subroutine of the washing machine motor drive device in the third embodiment.

Next, the operating sequence of a control device 306 built in a washing machine motor drive device in accordance with a third exemplary embodiment of the present invention is described. Like in the embodiments 1 and 2, flow charts showing the sequence of an operation program of a microcomputer forming control device 306 are used. Besides FIG. 4, FIG. 7 and FIG. 8 used in the embodiment 1, those charts in FIG. 19, FIG. 20 and FIG. 21 are used for describing the operating sequence of a control device 306 constituting the washing machine drive control device in the present embodiment 3.

The washing operation in embodiment 3 proceeds along the flow chart of FIG. 4 of embodiment 1; starting at step S100 and ending at S112 where judgement is made as to whether or not the washing is finished. The detailed description of each process is not repeated here.

Figure 19:
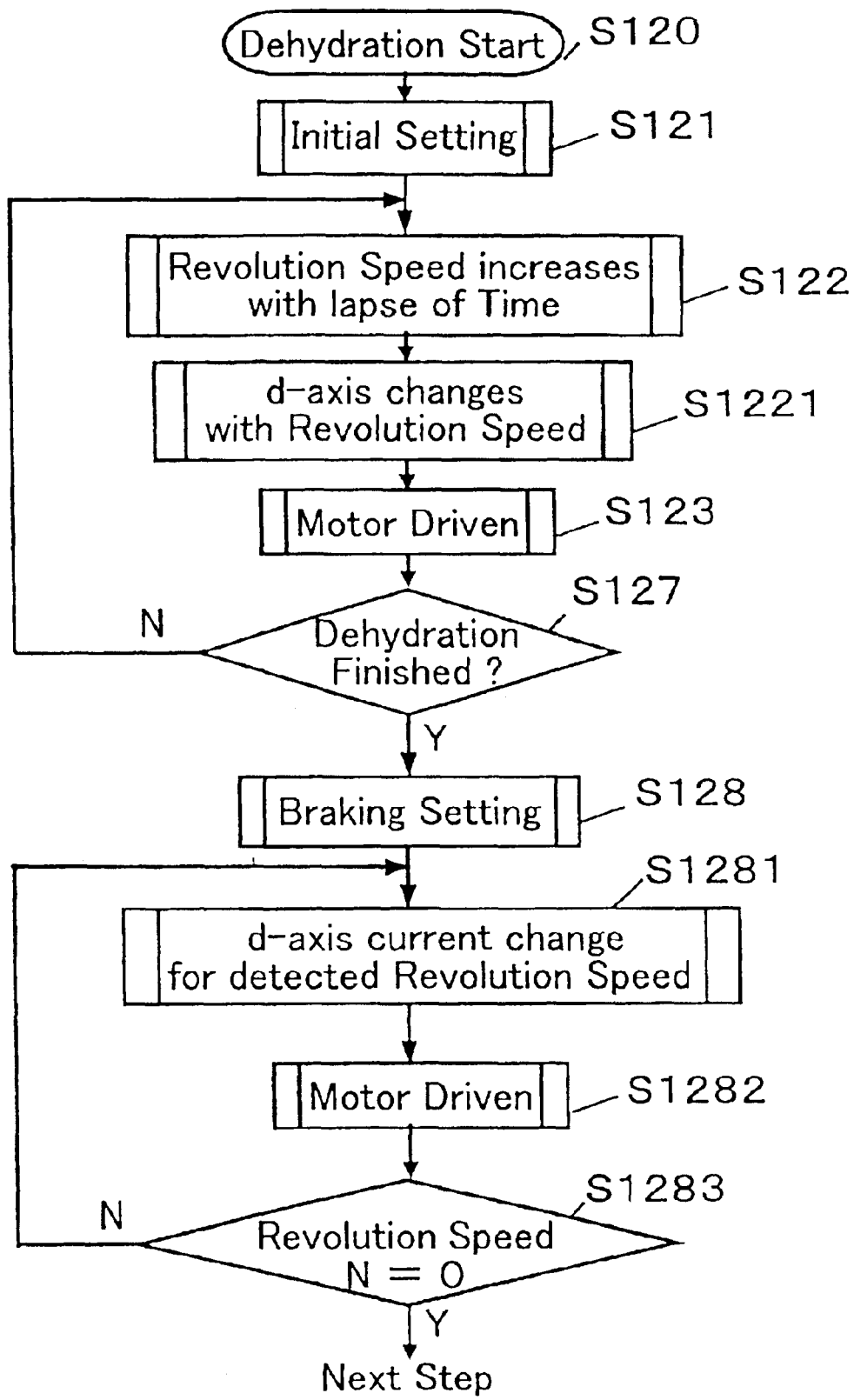
FIG. 19 is a flow chart used to describe the dehydration operation of the washing machine motor drive device in the third embodiment.

The dehydration operation in embodiment 3 proceeds along a flow chart of FIG. 19. Referring to FIG. 19, the dehydration operation starts at step S120, various initial settings such as the highest specified revolution speed Ns max. during the dehydration operation, the initial speed of spinning revolution, etc. are made at S121, and then at S122 the revolution speed is specified so that it increases along with the lapse of time. The specified revolution speed has the upper limit; the speed can not be specified to be higher than the upper limit. The steps so far remain the same as those in the embodiment 1.

Next, the operation proceeds to S1221 where specified d-axis current is changed in accordance with the specified revolution speed. For driving in a high speed revolution, a flux-weakening control is provided and the d-axis current is specified in the negative. Then, the operation proceeds to S123 to execute a motor drive subroutine shown in FIG. 20. At S127, the operation judges as to whether or not the dehydration operation is finished. If it is judged to be finished, it proceeds to S128 for braking.

Step S128 is for making various initial settings for a braking operation; where, initial setting of the d-axis current and the q-axis current, and a torque current control, not a revolution speed control, are specified. Basically, what is performed here is simply turning the torque instruction to the negative in the motor drive subroutine. As already described referring to the vector chart of FIG. 18, the d-axis current and the q-axis current are to be specified in the negative, and the initial braking d-axis current value to be greater than the q-axis current.

Figure 22:
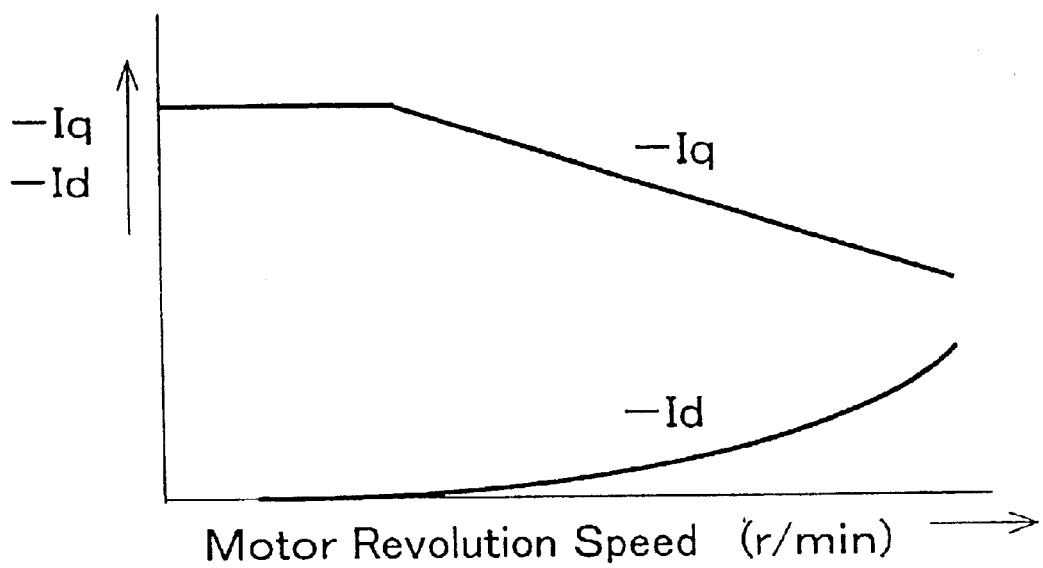
FIG. 22 is a chart showing the relationship among motor revolution speed, current of d-axis and current of q-axis of the washing machine motor drive device in the third embodiment.

Then the operation proceeds to S1281, where the d-axis current is changed in accordance with the revolution speed. Basically, the q-axis current may be controlled at a constant value. However, when the q-axis specified current value and the d-axis specified current value are changed in accordance with the revolution speed, a regenerative power in the inverter circuit 3 at the high speed revolution region can be prevented, and a decrease of torque at the low speed revolution region can be avoided, as shown in FIG. 22.

At S1282, the motor drive subroutine of FIG. 20 is once again executed, and then at S1283, the operation judges as to whether or not the revolution has stopped. If judged stopped, the operation proceeds to the next step; if judged not stopped, the operation returns to S1281.

A motor drive subroutine in embodiment 3 is performed along the flow chart of FIG. 20. Referring to FIG. 20, the motor drive subroutine starts at step S200, and Step S2001 is for making an initial judgement at the start of the subroutine execution. Practically described, the subroutine judges as to whether it is the start of driving or the initial stage of braking; if Yes, the subroutine proceeds to S201 for various initial settings, it exchanges parameters with the main routine and executes various settings, and then it proceeds to S202 for the revolution start control or the initial braking control.

The steps S201 and S202 are executed only once at the start. The start control is made by applying a certain voltage to a motor for 120° at the initial stage where a revolution speed feedback control is impossible. It provides a soft start by starting with a low voltage and gradually raising the voltage to the motor along with the lapse of time. For the braking operation, the negative d-axis current is increased while the negative q-axis current is decreased for ensuring a soft start, where a sharp braking torque is not applied thereto.

And then, the subroutine executes the steps from S203 for judging as to whether or not there is a carrier signal interruption through S207, which is a revolution speed control subroutine. The steps until S208 remain exactly the same as those in the embodiment 1, so the description of which is omitted to avoid duplication. It is to be noted that in the motor drive subroutine of the present embodiment 3, the carrier signal interruption subroutine S203 uses the same flow chart of FIG. 7 used in the embodiment 1, and also the position signal interruption subroutine S206 uses the flow chart of FIG. 8. However, in executing the revolution speed control subroutine, it proceeds along a flow chart FIG. 21, which is a point of difference from the embodiment 1.

In FIG. 21, the revolution speed control subroutine starts at step S500. At S501, a number of motor revolutions N is called, and at S5020 the subroutine judges a flag as to whether it is a normal drive or a speed reduction for braking. If it is judged a normal driving, the subroutine proceeds to S5021, where the q-axis current is controlled based on a difference between the specified revolution speed and detected revolution speed for the purpose of a torque control. If it is judged a speed reduction for braking, the subroutine proceeds to S5022 for a torque control in the negative. Namely, the q-axis current is specified at −Iqs for controlling the braking torque.

In the revolution speed control subroutine flow chart of FIG. 21, the steps from S505, where d-axis current Id obtained from the three-phase/two-phase d-q convereter 61 is called, through S511 for storing the d-axis control voltage Vd and the q-axis control voltage Vq, respectively, in a memory device, and S512 for returning to the revolution speed control subroutine remain totally the same as those in the embodiment 1. So a detailed description of each step is not repeated here.

Figure 23:
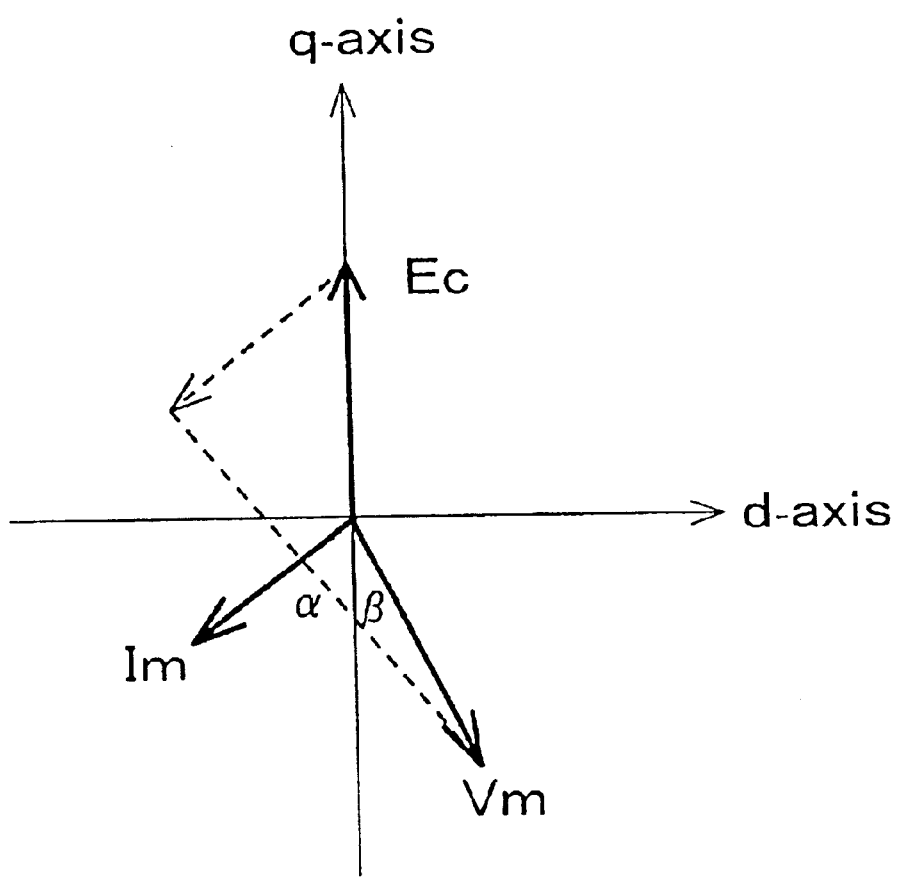
FIG. 23 is a vector diagram showing motor current and motor voltage used to describe the operation of the washing machine motor drive device in the third embodiment.

FIG. 23 is a vector diagram showing motor current Im and voltage Vm applied to a motor resolved into the d-axis and the q-axis. A product of the motor current Im and the voltage Vm applied to motor represents an energy provided to the motor 4 from inverter circuit 3; assuming an angle (α+β) of the motor current Im and the voltage Vm applied to motor to be φ, an effective energy delivered to the motor from inverter circuit is P=Im Vm cos φ. If the φ is 90° or smaller, it becomes a positive energy and the inverter circuit delivers energy to the motor, and back electromotive force of motor (Pg=−Iq×Ec) turns out to be a braking torque which is consumed by the internal resistance of motor. On the other hand, if φ is more than 90°, it becomes a negative energy, and energy is regenerated from the motor 4 to the inverter circuit 3 side.

Since cos φ=cos (α+β)=cos α cos β−sin α sin β=(Iq Vq−Id Vd)/ Im Vm, P=Iq Vq−Id Vd. Namely, a motor power can be calculated from the difference between q-axis power and d-axis power; when the motor power is zero, the motor coil consumption power and the back electromotive force of motor are in the balance, when the motor power P is positive the coil consumption power is greater. On the other hand, when the motor power is negative, the back electromotive force is greater and a regenerative energy is generated. Thus, the energy balance can be detected by judging the greater or smaller of motor power P.

Referring to the vector diagram of FIG. 23, the Iq Vq is positive, while the Id Vd is negative. Since Id is negative, if the Vd is increased in the positive direction, P turns out to be negative to perform a regenerative operation. Therefore, during a braking operation, where the q-axis current Id and the d-axis current Id are negative, if the d-axis voltage Vd is increased in the positive direction, it turns out to be a regenerative operation. So, it can be understood that the regenerative energy can be put under control by controlling the d-axis current Id.

In other words, if the voltage vector Vm is revolved, anti-clockwise energy is regenerated, whereas if it is revolved clockwise, the energy is consumed at motor 4. By controlling voltage or current in the direction of d-axis and calculating the increase/decrease of electric power P, the energy can be consumed at motor 4 without causing the regeneration. Thus, the vector control can maximize the braking torque without having a regenerative energy in the inverter circuit 3 side.

As described above, in a third embodiment of the present invention, a control device built in the motor drive device of a washing machine motor drive device resolves motor current into a current component corresponding to magnetic flux and a current component corresponding to torque. For braking the revolution of a motor, since the control device controls the current component corresponding to magnetic flux and the current component corresponding to torque independently, the braking torque can be maximized through the vector control on the current component corresponding to torque, while the control on the current component corresponding to magnetic flux enables to control a regenerative energy preventing an abnormal rise of DC voltage in the inverter circuit. Since the control device built in the motor drive device controls, at the braking of motor, the current component corresponding to torque, so that it meets a certain specific value, braking torque can be controlled to show a certain specific value by specifying the torque current component in the negative, thereby making the braking time shorter. Since the control device controls the current component corresponding to magnetic flux and the current component corresponding to torque to be showing respective specified values, the back electromotive force of a motor and the energy consumed by inner resistance of a motor can be controlled independently. Therefore, regenerative energy can be controlled and an abnormal rise of DC voltage in the inverter circuit can be prevented. In addition, the braking torque and the energy consumption by the inner resistance of the motor can be controlled independently in accordance with the revolution speed. As a result, it can prevent both the increase of regenerative energy at high speed revolution region, and the decrease of braking torque at low speed revolution region. Furthermore, since the control device built in the motor drive device specifies the current component corresponding to magnetic flux so that it is greater than the current component corresponding to torque at the start of the motor braking operation, an excessive braking torque at the start and an abnormal rise of DC voltage in the inverter circuit due to regenerative energy can be prevented.

Figure 24:
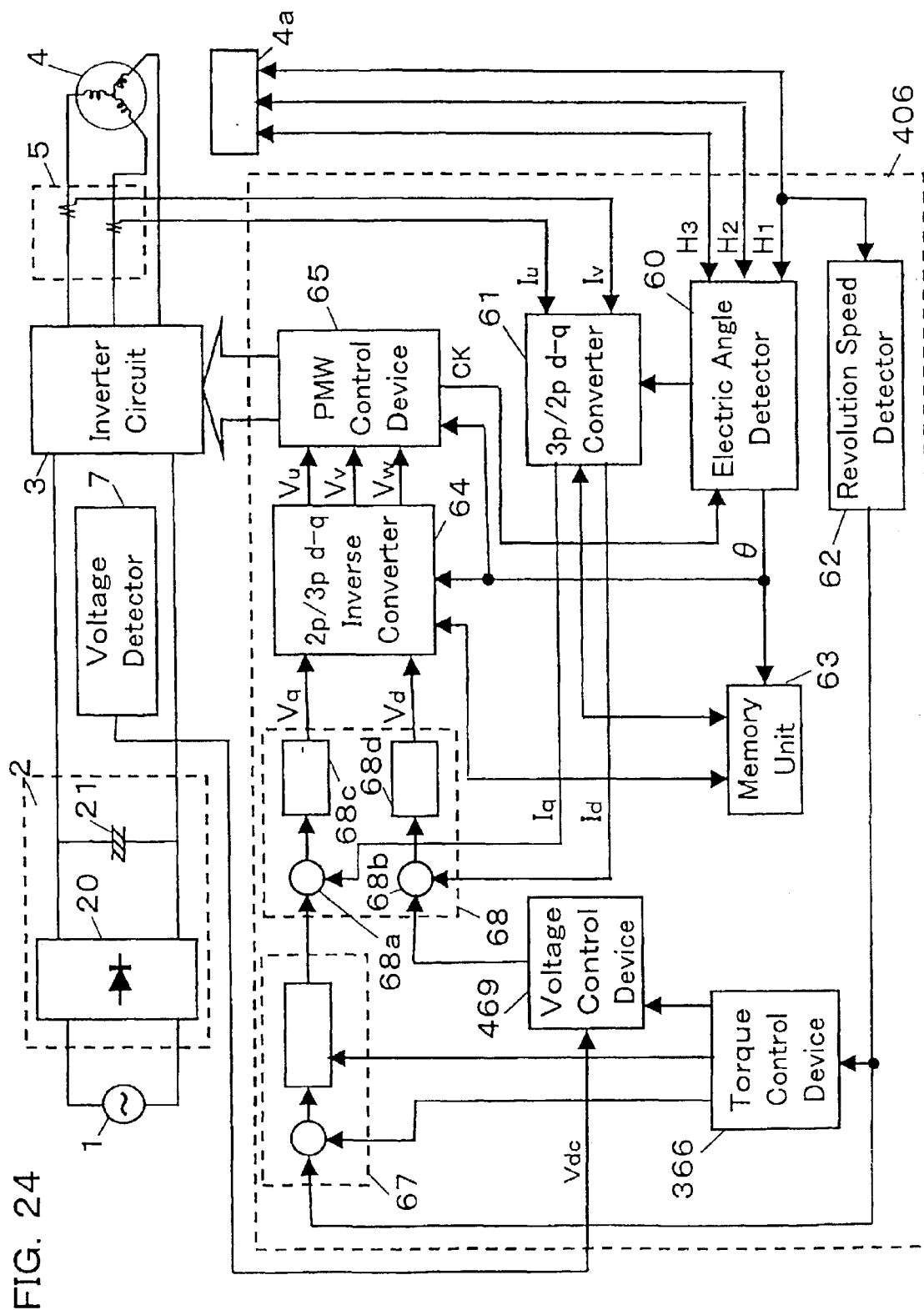
FIG. 24 is a block diagram showing other structure of the washing machine motor drive device in accordance with the third embodiment.

FIG. 24 shows a block diagram of another example of the washing machine motor drive device in accordance with third embodiment of the present invention. As compared with that of FIG. 15, the washing machine motor drive device of FIG. 24 further comprises in the power supply sector, a voltage detector 7 provided in parallel with capacitor 21, and a voltage control device 469 in the control device 406.

Referring to FIG. 24, the voltage detector 7 is for detecting DC voltage of inverter circuit 3, while the voltage control device 469 disposed in the control device 406 is for controlling a regenerative energy to the inverter circuit 3 through a vector control. An output signal vdc of the voltage detector 7 is delivered to the voltage control device 469, while the voltage control device 469 compares at the braking operation, the output signal vdc of voltage detector 7 with the DC voltage specified value vdcs of inverter circuit 3 to change the d-axis current specified value Ids and controls the output d-axis voltage Vd of current control device 68. The rest of the elements remain the same as those of FIG. 15, so the same constituent parts are represented by using the same symbols and a description of which is omitted here.

Next, the operation of a washing machine motor drive device shown in FIG. 24 is described. As described earlier referring to a vector chart FIG. 23, when vector Vm of the voltage applied on the motor is increased in the d-axis direction at braking, a regenerative energy is generated leading to an increased DC voltage in the inverter circuit 3. Therefore, the regenerative energy may be controlled through a control of d-axis voltage or d-axis current, thereby controlling the DC voltage in inverter circuit to be constant.

Figure 25:
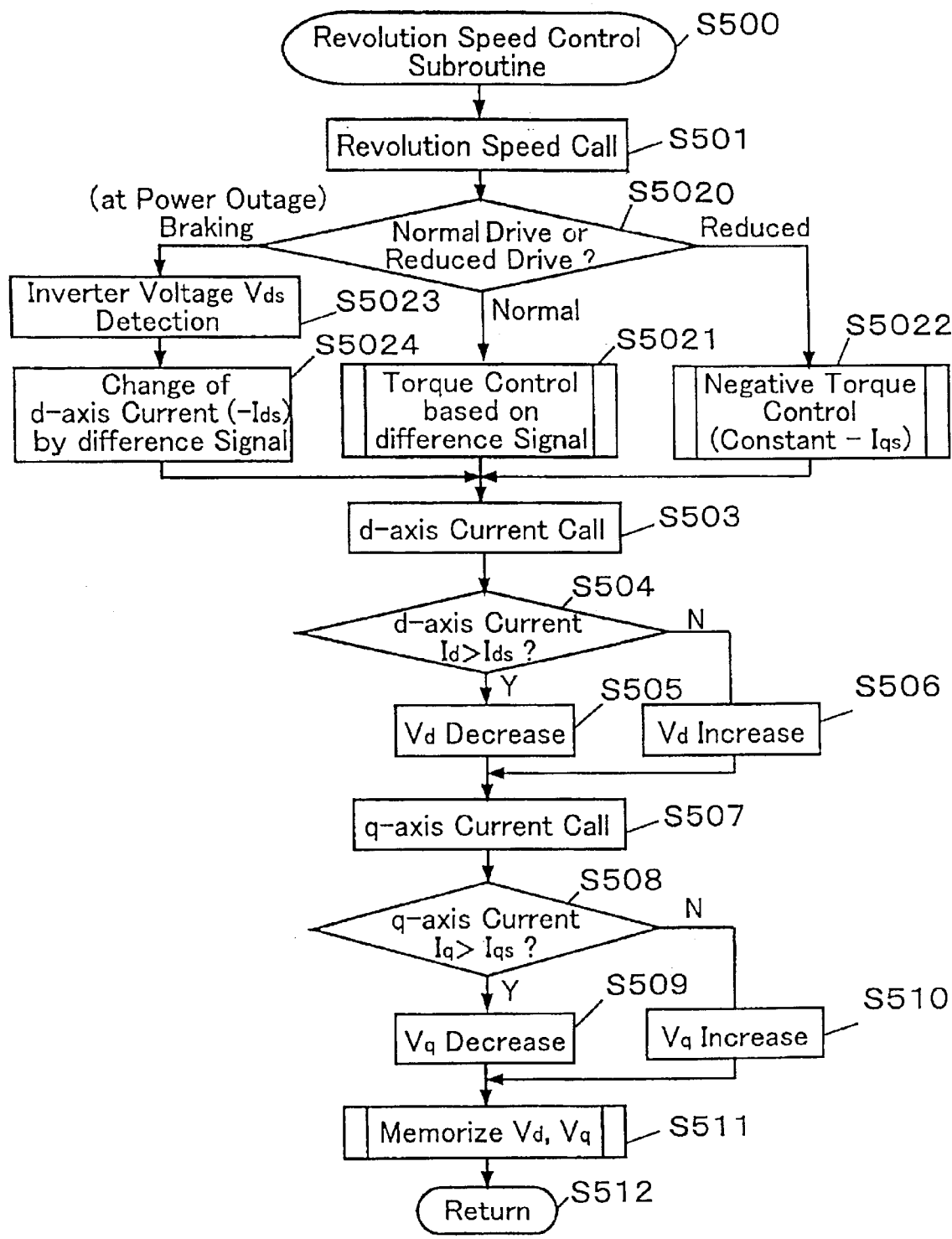
FIG. 25 is a flow chart used to describe the operation of other revolution speed control subroutine of the washing machine motor drive device in the third embodiment.

FIG. 25 is a revolution speed control subroutine used to describe the operation and the control performed by the voltage detector and the voltage control device, which have been added to the washing machine motor drive device, as shown in FIG. 24. The subroutine shown in FIG. 25 is identical to the revolution speed control subroutine of FIG. 21, which is a counterpart of the motor drive device shown in FIG. 15, adding a step for controlling regenerative energy. Referring to FIG. 25, the revolution speed control subroutine starts at step S500, detected revolution speed N is called at S501, and at S5020, the subroutine judges whether it is a normal operation, a normal braking or an emergency braking at power failure. If it is judged to be an emergency braking at power failure, the subroutine proceeds to S5023, where the DC voltage of the inverter circuit is detected by voltage detector 7, and then at S5024, the d-axis current specified value is controlled by an error signal between the DC voltage specified value and the detected voltage, and then d-axis current is called at S503. Other procedures and sequences describing the operations and functions remain the same as those described with reference to FIG. 15. So, the detailed description on which is omitted here for avoiding duplication.

In a case where emergency braking is needed, because of an unexpected power failure or by an inadvertent blocking of the power switch, there would be no energy available for a control circuit which drives inverter circuit 3. However, in the above described example of the washing machine motor drive device in a third embodiment, which example further comprises a voltage detector and a voltage control device, power supplied to the control circuit is secured by regenerating a motor back electromotive force to the DC source side of inverter circuit 3. In this way, the inverter circuit can be kept running.

The configuration of FIG. 24 shows an example where the voltage control device 469 controls the d-axis current specified value Ids. However, the voltage control device 469 may control direct on the d-axis voltage Vd. Also, in order to have the voltage vector revolved clockwise or counter-clockwise, the control may be performed keeping a relationship with the d-axis voltage Vd and the q-axis voltage Vq. In any of the cases, when the inverter DC voltage goes high, the d-axis voltage is lowered and the d-axis current is increased in the negative direction. On the other hand, when the inverter DC voltage goes low, the d-axis voltage is raised and the d-axis current is increased in the positive direction. A braking torque can be kept constant by controlling the q-axis current to a certain specific negative value, while controlling the d-axis current in accordance with DC voltage.

Figure 26:
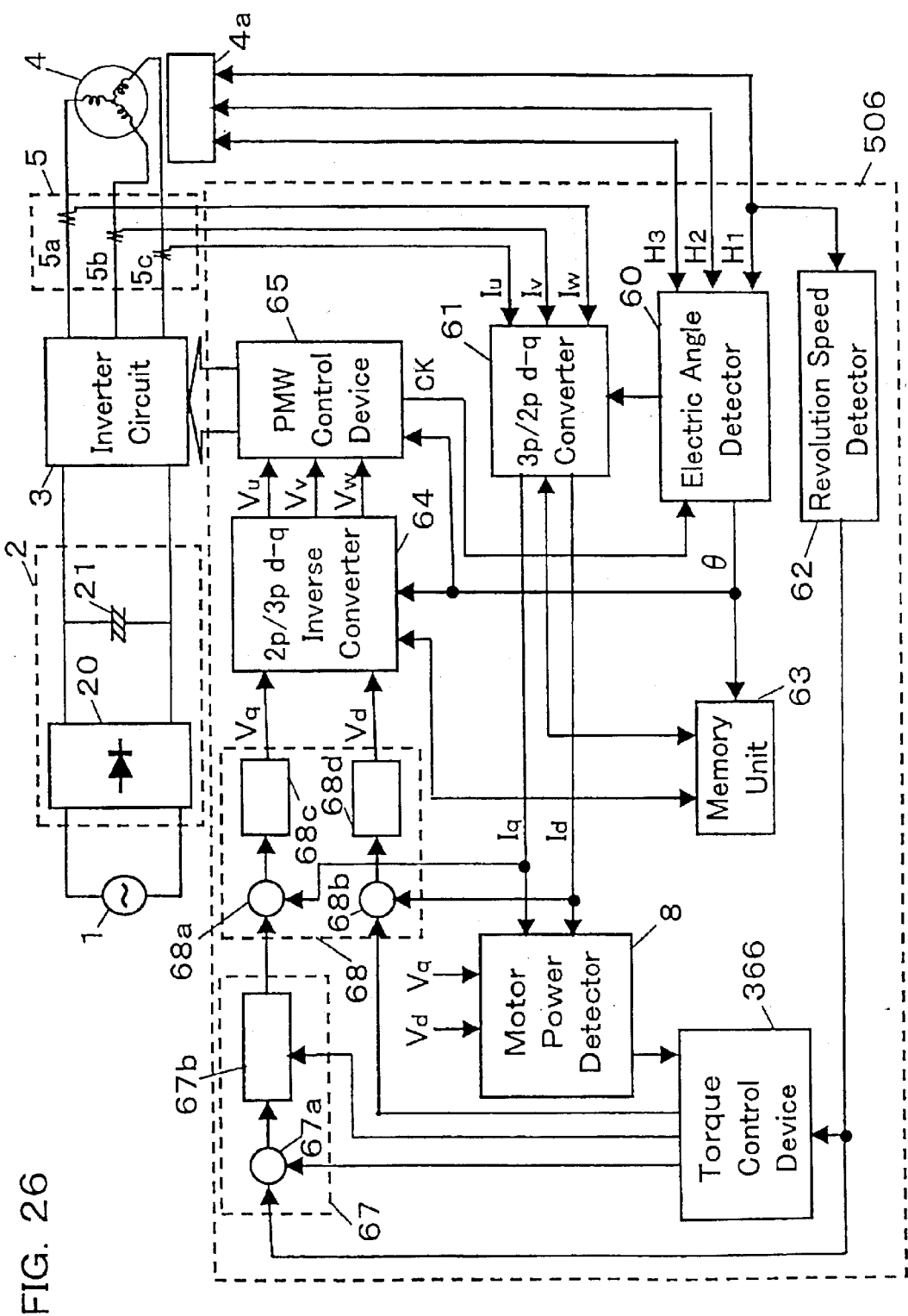
FIG. 26 is a block diagram showing other structure of the washing machine motor drive device in the third exemplary embodiment.

The configuration of FIG. 26 shows still another example of a washing machine motor drive device in accordance with the third embodiment of the present invention. As compared with that of FIG. 15, the washing machine motor drive device of FIG. 26 further comprises a motor power detector 8 disposed in control device 506.

Referring to FIG. 26, the control device 506 is provided with a motor power detector 8 for detecting electric power of motor 4. The motor power can be detected from a motor phase current, a voltage between the phases and the phase. However, in the motor drive device shown in FIG. 26, the same method as described referring to the vector chart of FIG. 23 can be used for the purpose; namely, a method using the product of d-axis current Id and d-axis voltage Vd, and the product of q-axis current Iq and q-axis voltage Vq. The remaining elements have the same structure as described earlier with reference to FIG. 15. Same constituent elements are represented by using the same symbols, a and duplicated description of which elements is omitted here.

The operation of a washing machine motor drive device shown in FIG. 26 is described more in detail in the following. For the purpose of detecting the motor power, an energy flow from inverter circuit 3 to motor 4 can be detected from the product of DC current of inverter circuit 3 and the DC voltage. If the power is positive, it is judged that the energy is consumed at the motor side, whereas if the power is negative, it is judged that there is a regenerative energy. In any case, the motor electric power makes an increases/decreases fluctuation during braking operation depending on the difference between the power consumption at motor coil and the power generation at motor.

Therefore, the regenerative power in the DC source side can be prevented by increasing the d-axis current or the d-axis voltage in the negative direction to have the voltage vector revolve clockwise. On -the other hand, when the braking torque is to be increased, the q-axis current may be increased in the negative direction.

Figure 27:
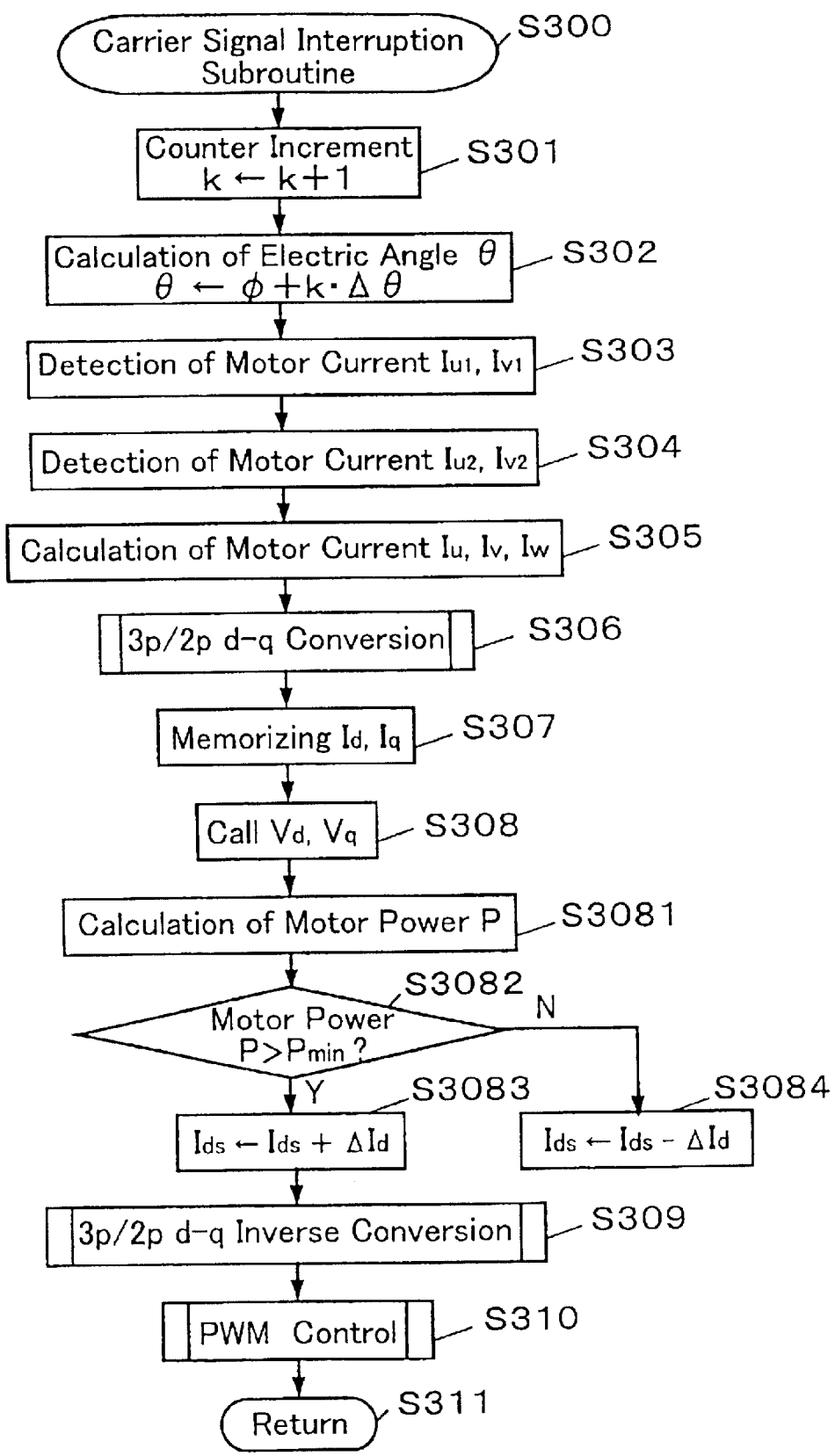
FIG. 27 is a flow chart showing the operation of other carrier signal interruption subroutine of the washing machine motor drive device in the third embodiment.
Figure 28:
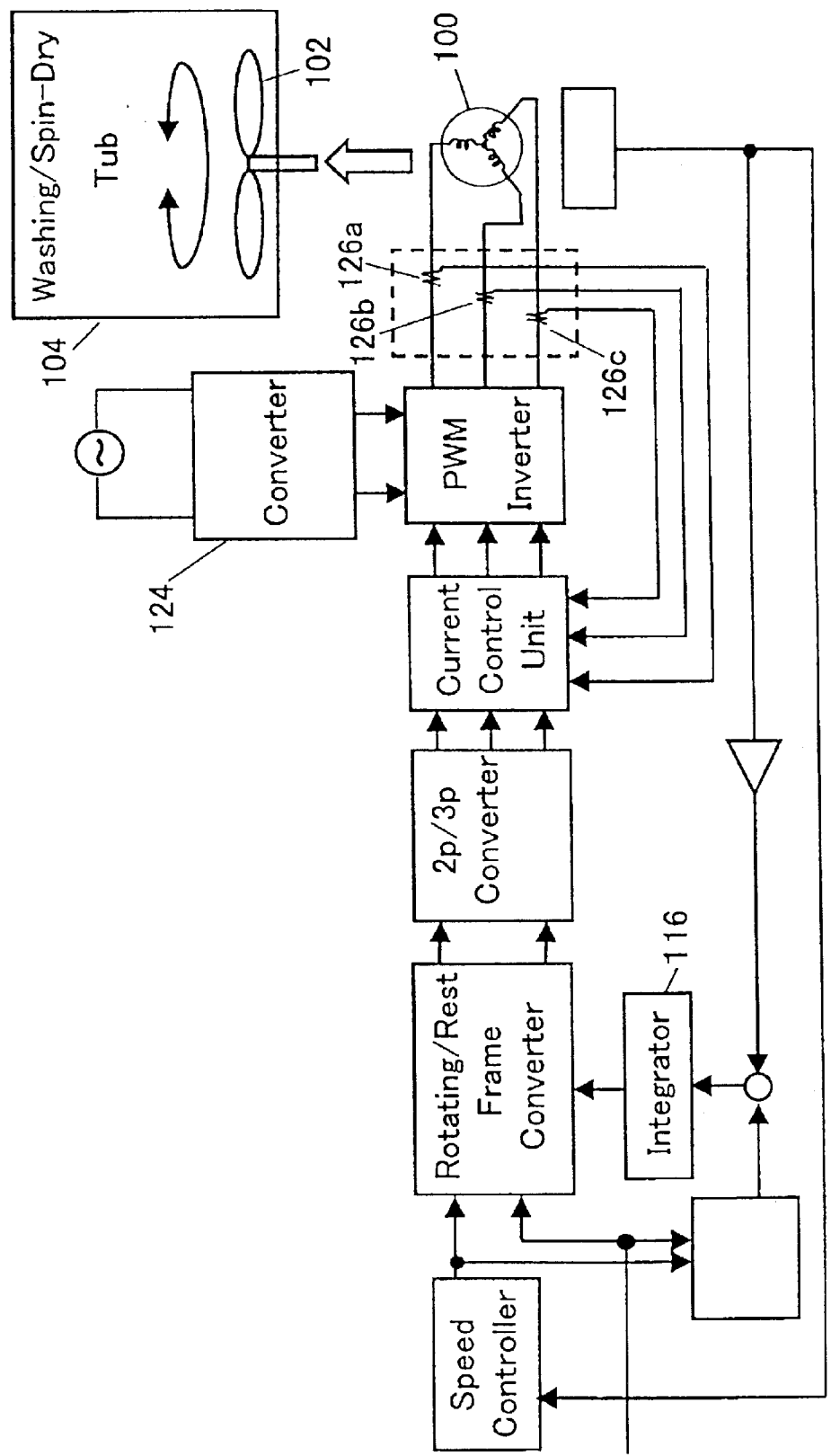
FIG. 28 is block diagram showing the structure of a conventional washing machine motor drive device.

FIG. 27 shows a carrier signal interruption subroutine used to describe the operation and the control performed by the motor power detector which has been added to the washing machine motor drive device of FIG. 26. The subroutine of FIG. 27 has been formed by adding a flow of motor power detection process onto the carrier signal interruption subroutine of FIG. 7, which subroutine corresponds to the motor drive device of FIG. 15. The steps from S300 through S308 remain the same as those of S300 through S308 in FIG. 7, so the description on which is omitted here.

Now, description is made of the flow of the motor power detection process performed by the added motor power detector. After the step S308 for calling Vd, Vq is finished, and a motor electric power P is calculated at S3081 to provide a difference between the power (Id×Vd) corresponding to magnetic flux and the power (Iq×Vq) corresponding to torque. Then, at S3082, the greater/smaller of the motor electric power P and the specified value Pmin. are compared; if the motor electric power P is greater than the specified value Pmin., the process proceeds to S3083 to have the d-axis current specified value Ids increased by ΔId.

Since the initial value of d-axis current specified value Ids is in the negative, the increase in positive direction is identical to bringing the d-axis current towards zero, which means in the relative sense, reducing the power consumption by motor coil. Although it is not shown in the flow chart, the d-axis current value Ids is specified certainly in the negative at braking.

If the motor electric power P is smaller than the specified value Pmin., the process proceeds to S3084 to have the d-axis current specified value Ids decreased by ΔId. In this case, the d-axis current is increased in the negative direction to have the coil consumption power increased. This is because the decreasing motor electric power P implies an increasing power generation energy of motor, which leads to an increased possibility of a regenerative power occurring in the DC source side.

Then, the process proceeds to step S309' to execute the same flow as in FIG. 7. The d-axis current specified value Ids is obtained at the carrier signal interruption subroutine, which data are transferred to the revolution speed control subroutine of FIG. 21. Consequently, the d-axis voltage Vd is controlled, and the d-axis power is controlled, and the revolution of voltage vector Vm is controlled.

As described above, in the example of the washing machine motor drive device in accordance with the third embodiment and further comprising a motor electric power detector, the motor coil consumption power can be controlled with the braking torque being controlled to be substantially fixed, by detecting the motor electric power and controlling the d-axis current and the q-axis current independently. Therefore, it turns out to be possible to conduct a control in which the entire back electromotive force of a motor is consumed by the motor coil. Thus, the arising of a regenerative power on the DC source side of inverter circuit can be prevented, an abnormal voltage rise in the inverter circuit 3 can be avoided, and the braking torque can always be maintained at the highest possible level. Thus, the motor electric power detector helps to implement a highly reliable braking device for washing machines.

As described in the foregoing, in a washing machine motor drive control device of the present invention, a control device built in the motor drive device resolves motor current into a current component corresponding to magnetic flux and a current component corresponding to torque, and controls the current corresponding to magnetic flux and the current component corresponding to torque independently in accordance with a control stage of a motor. Therefore, motor's torque-revolution speed characteristic can be changed, and constant torque control, and an increase of the torque at high speed revolution or an improvement of efficiency at low speed revolution are enabled. This leads to downsizing of a motor and energy conservation with the motor. Since the current component corresponding to magnetic flux and the current component corresponding to torque are controlled independently in accordance with motor revolution speed, the torque-revolution speed characteristic can be changed. Since the current component corresponding to magnetic flux is controlled to increase in the negative direction at high speed revolution of motor, it turns out to be possible to increase the torque of a motor at high speed revolution and to implement a precise flux-weakening control. Since the current component corresponding to magnetic flux is controlled to be substantially zero at low speed revolution, it turns out to be possible to drive a motor at a maximized efficiency at low speed operation, at which the efficiency is intrinsically low. Since the current component corresponding to magnetic flux is controlled to increase in the negative direction at high speed revolution of a motor for revolving a washing/spinning tub for dehydration operation, it turns out to be possible to increase the torque of a motor at high revolution speed through a flux-weakening control. Thus, the control can be performed covering up to a high speed revolution of a motor for dehydration operation. Therefore, the revolution speed can be increased for an increased rate of dehydration.

In the washing operation when a motor is revolving at high speed for driving an agitator, since the current component corresponding to magnetic flux is controlled to increase in the negative direction, it turns out to be possible to increase the torque at high speed motor revolution through a flux-weakening control. Thus, the control can be performed covering up to a high speed revolution for agitator driving, and the washing capability can be raised with a stronger water flow. Still further, since the current component corresponding to magnetic flux and the current component corresponding to torque can be controlled independently in accordance with the amount of clothes detected by the clothes amount detector, it turns out to be possible to increase the torque at high speed revolution through a flux-weakening control performed in accordance with the amount of clothes, and the control can be expanded to cover a high speed revolution even in a case where there are many clothes. Thus, the washing capability can be increased, and the rate of dehydration can also be improved.

The control device built in the motor drive device comprises a start control device for controlling the motor revolving speed at the startup stage. The start control device performs a direct control on a voltage to be applied to motor at the startup stage, and then controls the current component corresponding to magnetic flux and the current component corresponding to torque independently. This makes it easy to provide a soft-start where the starting current is kept low to suppress the starting torque, and then transfer smoothly to a current feedback control to prevent an abnormal rise in the revolution speed. Besides making the transfer to current feedback control smooth and preventing the abnormal rise in revolution speed, the independent control on respective current component corresponding to magnetic flux and current component corresponding to torque makes it possible to use an inexpensive AC transformer in the current detector. So, this helps in implementing a motor drive device that is inexpensive yet has a high performance.

A control device built in the washing machine motor drive device resolves motor current into a current component corresponding to magnetic flux and a current component corresponding to torque, and controls, at the braking operation, the current component corresponding to magnetic flux and the current component corresponding to torque independently. Therefore, the braking torque can be maximized by controlling the current component corresponding to torque through a vector control. An abnormal rise of DC voltage in the inverter circuit can be prevented by putting the regenerative energy under control through a control on the current component corresponding to magnetic flux. Since a control device built in the motor drive device controls at the motor braking operation, the current component corresponding to torque meeting a certain specific value, the braking torque can be controlled to a certain specific value by specifying a torque current component in the negative. Thus, the braking time can be made shorter. Since the current component corresponding to magnetic flux and the current component corresponding to torque are controlled to meet respective specified values, the back electromotive force of a motor and the energy consumption by internal resistance of a motor can be controlled independently. Therefore, the regenerative energy can be put under control, and an abnormal rise of DC voltage in the inverter circuit can be prevented. Furthermore, the braking torque and the energy consumption by internal resistance of motor can be controlled separately in accordance with revolution speed. As a result, an increase of regenerative energy in the high speed revolution region, as well as a decrease of braking torque in the low speed revolution region, can be prevented. Still further, since a control device built in the motor drive device specifies at the start of braking operation, the current component corresponding to magnetic flux to be greater than the current component corresponding to torque, an excessive braking torque at the start of braking operation, as well as an abnormal rise of DC voltage in the inverter circuit due to regenerative energy, can be avoided.

What is claimed is:

1. A washing machine motor drive device comprising:
   an alternating current source;
   a rectifier circuit connected to said alternating current source;
   an inverter circuit operable to convert DC power of said rectifier circuit into AC power;
   a DC brushless motor driven by said inverter circuit, said DC brushless motor being operable to drive an agitator or a washing/spinning tub;
   a rotor position detector operable to detect a rotor position of said DC brushless motor;
   a current detector operable to detect a current of said DC brushless motor; and
   a control device operable to control said inverter circuit, wherein
      said control device resolves the current of said DC brushless motor into a current component that corresponds to magnetic flux and a current component that corresponds to torque, controls the current component corresponding to magnetic flux and the current component corresponding to torque independently, and controls the current component corresponding to magnetic flux so that the current component corresponding to magnetic flux is increased in a negative direction in accordance with a revolution speed of said DC brushless motor.

2. A washing machine motor drive device of claim 1, wherein
   said control device controls the current component corresponding to magnetic flux so that the current component corresponding to magnetic flux becomes substantially zero when the revolution speed of said DC brushless motor is low.

3. A washing machine motor drive device of claim 1, wherein
   said control device controls the current component corresponding to magnetic flux so that the current component corresponding to magnetic flux is increased in a negative direction when the revolution speed of said DC brushless motor is high for driving a washing/spinning tub for a dehydration operation.

4. A washing machine motor drive device of claim 1, wherein
   said control device controls the current component corresponding to magnetic flux so that the current component corresponding to magnetic flux is increased in a negative direction when the revolution speed of said DC brushless motor is high for driving an agitator for a washing operation.

5. A washing machine motor drive device of claim 1, further comprising a clothes amount detector operable to detect an amount of clothes in a washing/spinning tub, wherein
   said control device controls the current component corresponding to magnetic flux and the current component corresponding to torque independently in accordance with the amount of clothes detected by said clothes amount detector.

6. A washing machine motor drive device of claim 1, wherein said control device comprises a start control device operable to control motor revolution at a start of revolution, and
   said control device makes a direct control on a voltage to be applied to said DC brushless motor at the start of revolution via said start control device, and then controls the current component corresponding to magnetic flux and the current component corresponding to torque independently.

7. A washing machine motor drive device of claim 1, wherein said control device comprises a start control device operable to control motor revolution at a start of revolution, and
   said control device makes a direct control on a voltage to be applied to said DC brushless motor at the start of revolution via said start control device, and then controls the current component corresponding to magnetic flux and the current component corresponding to torque independently in accordance with revolution speed.

8. A washing machine motor drive device of claim 1, wherein
   said control device controls the current component corresponding to magnetic flux and the current component corresponding to torque independently at a motor braking operation.

9. A motor drive device of claim 8, wherein
   said control device controls the current component corresponding to torque so that the current component corresponding to torque meets a specified value at the motor braking operation.

10. The motor drive device of claim 8, wherein
    said control device controls the current component corresponding to torque so that the current component corresponding to torque is specified in a negative value at the motor braking operation.

11. A motor drive device of claim 8, wherein
    said control device controls the current component corresponding to magnetic flux and the current component corresponding to torque independently so that the current components corresponding to magnetic flux and torque meet respective specified values at the motor braking operation.

12. A motor drive device of claim 8, wherein said control device controls the current component corresponding to magnetic flux so that the current component corresponding to magnetic flux is greater than the current component corresponding to torque at a start of a motor braking operation.

13. A motor drive device of claim 8, further comprising revolution speed detector operable to detect a revolution speed from an output signal of said rotor position detector, wherein said control device controls the current component corresponding to magnetic flux and the current component corresponding to torque independently in accordance with the revolution speed so that the current components corresponding to magnetic flux and torque meet respective specified values at a motor braking operation.

14. A washing machine motor drive device comprising:

an alternating current source;

a rectifier circuit connected to said alternating current source;

an inverter circuit operable to convert DC power of said rectifier circuit into AC power;

a motor driven by said inverter circuit, said motor being operable to drive an agitator or a washing/spinning tub;

a rotor position detector operable to detect a rotor position of said motor;

a current detector operable to detect a motor current of said motor;

a DC voltage detector operable to detect DC voltage of said inverter circuit; and a control device operable to control said inverter circuit, wherein said control device resolves the motor current into a current component that corresponds to magnetic flux and a current component that corresponds to torque, and controls the current component corresponding to magnetic flux and the current component corresponding to torque independently so that the DC voltage meets a specified value at a motor braking operation.

15. A motor drive device of claim 14, wherein said control device controls the current component corresponding to magnetic flux, or a voltage component, so that the DC voltage of said inverter circuit meets a specified value at the motor braking operation.

16. A washing machine motor drive device comprising:

an alternating current source;

a rectifier circuit connected to said alternating current source;

an inverter circuit operable to convert DC power of said rectifier circuit into AC power;

a motor driven by said inverter circuit, said motor being operable to drive an agitator or a washing/spinning tub;

a rotor position detector operable to detect a rotor position of said motor;

a current detector operable to detect a motor current of said motor;

a motor electric power detector operable to detect a power of said motor; and a control device operable to control said inverter circuit, wherein said control device resolves the motor current into a current component that corresponds to magnetic flux and a current component that corresponds to torque, and controls the current component corresponding to magnetic flux and the current component corresponding to torque independently in accordance with the power of said motor at the motor braking operation.

17. A motor drive device of claim 16, wherein said motor electric power detector makes calculations based on a power component corresponding to magnetic flux and a power component corresponding to torque for performing control.

* * * * *